US 6,545,656 B1

(12) United States Patent
Yamazaki

(10) Patent No.: US 6,545,656 B1
(45) Date of Patent: Apr. 8, 2003

(54) LIQUID CRYSTAL DISPLAY DEVICE IN WHICH A BLACK DISPLAY IS PERFORMED BY A RESET SIGNAL DURING ONE SUB-FRAME

(75) Inventor: Shunpei Yamazaki, Tokyo (JP)

(73) Assignee: Semiconductor Energy Laboratory Co., Ltd. (JP)

(*) Notice: Subject to any disclaimer, the term of this patent is extended or adjusted under 35 U.S.C. 154(b) by 0 days.

(21) Appl. No.: 09/570,698

(22) Filed: May 12, 2000

(30) Foreign Application Priority Data

May 14, 1999 (JP) .......................... 11-134934
May 26, 1999 (JP) .......................... 11-146493

(51) Int. Cl.$^7$ ................................ G09G 3/36
(52) U.S. Cl. ........................... 345/94; 345/97
(58) Field of Search ................. 345/87, 92, 94, 345/97, 99, 100, 96, 88; 349/33, 34, 41, 42, 6, 7–9

(56) References Cited

U.S. PATENT DOCUMENTS

| | | | |
|---|---|---|---|
| 5,594,569 A | | 1/1997 | Konuma et al. ............ 349/122 |
| 5,643,826 A | | 7/1997 | Ohtani et al. .................. 437/88 |
| 5,796,380 A | * | 8/1998 | Kurematsu .................... 345/96 |
| 5,923,962 A | | 7/1999 | Ohtani et al. ................ 438/150 |
| 6,046,790 A | * | 4/2000 | Hara et al. ..................... 349/33 |
| 6,292,183 B1 | * | 9/2001 | Yamazaki et al. ........... 345/211 |
| 6,323,850 B1 | * | 11/2001 | Katakura et al. ........... 345/204 |

FOREIGN PATENT DOCUMENTS

JP          7-130652          5/1995

OTHER PUBLICATIONS

Yoshida, T. et al., "A Full–Color Thresholdless Antiferroelectric LCD Exhibiting Wide Viewing Angle with Fast Response Time," SID 97 Digest, pp. 841–844, 1997.
Furue, H. et al, "Characteristics and Driving Scheme of Polymer–Stabilized Monostable FLCD Exhibiting Fast Response Time and High Contrast Ratio with Gray–Scale Capability," SID 98 Digest, pp. 782–785, 1998.
English abstract re Japanese patent application No. 7-130652, published May 19, 1995.

* cited by examiner

Primary Examiner—Chanh Nguyen
(74) Attorney, Agent, or Firm—Cook, Alex, McFarron, Manzo, Cummings & Mehler Ltd.

(57) ABSTRACT

A liquid crystal display device afflicted with no image persistence is disclosed. The liquid crystal display device according to the present invention comprises a pixel portion in which a plurality of pixel TFTs are matrix-wise disposed, a source driver and a gate driver which feed a plurality of the TFTs with picture signals, and a liquid crystal material which has substantially no threshold value, characterized in that one frame is formed of a plurality of sub-frames, and, during at least one of a plurality of the sub-frames, the display by a reset signal is performed.

42 Claims, 28 Drawing Sheets

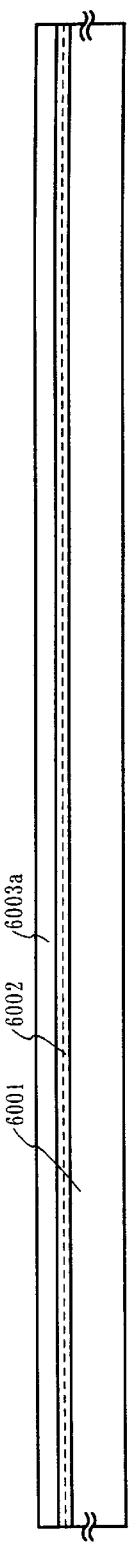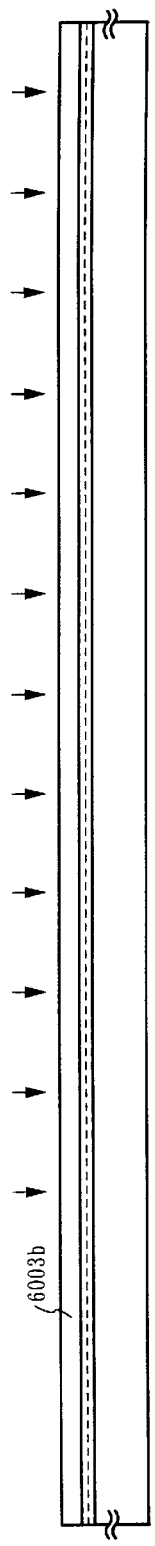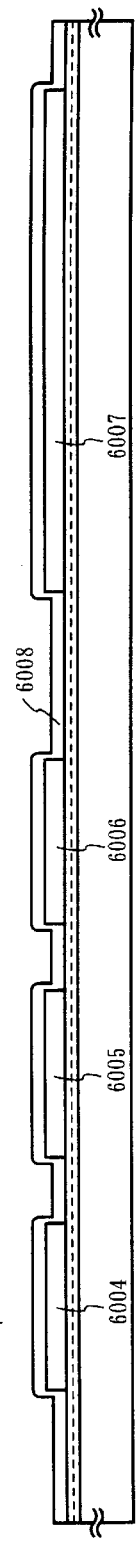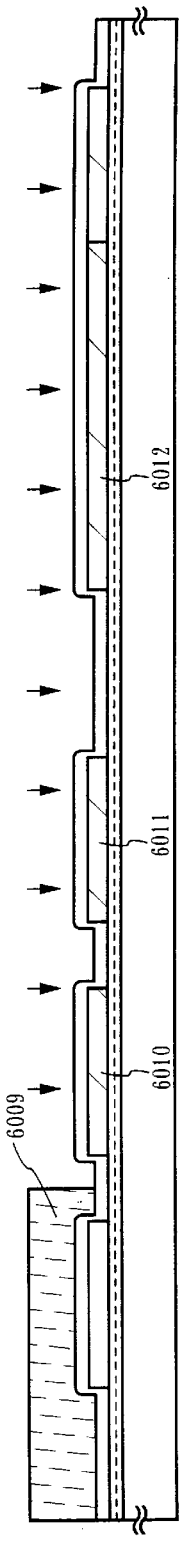

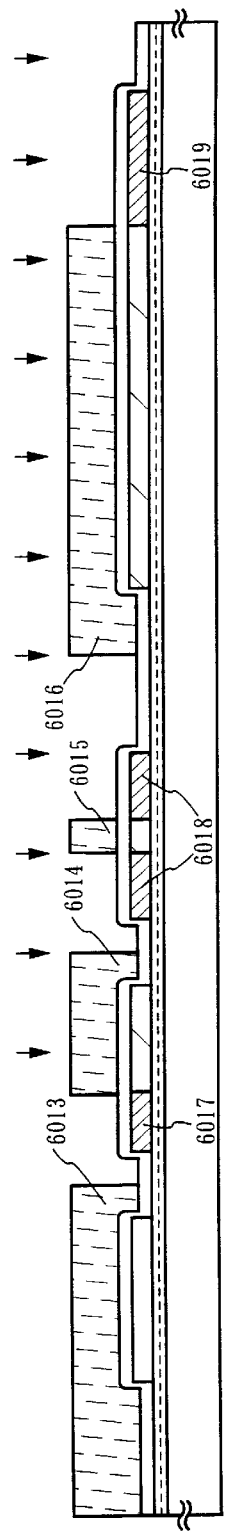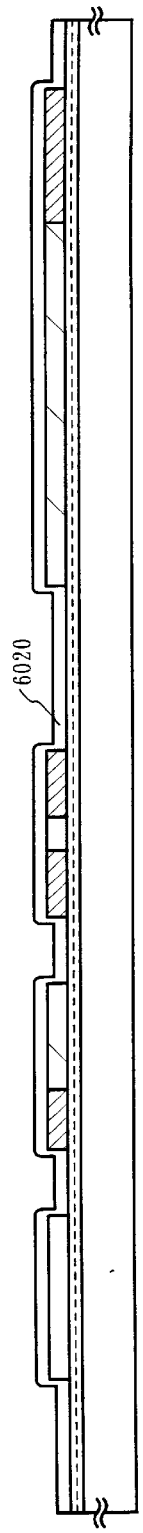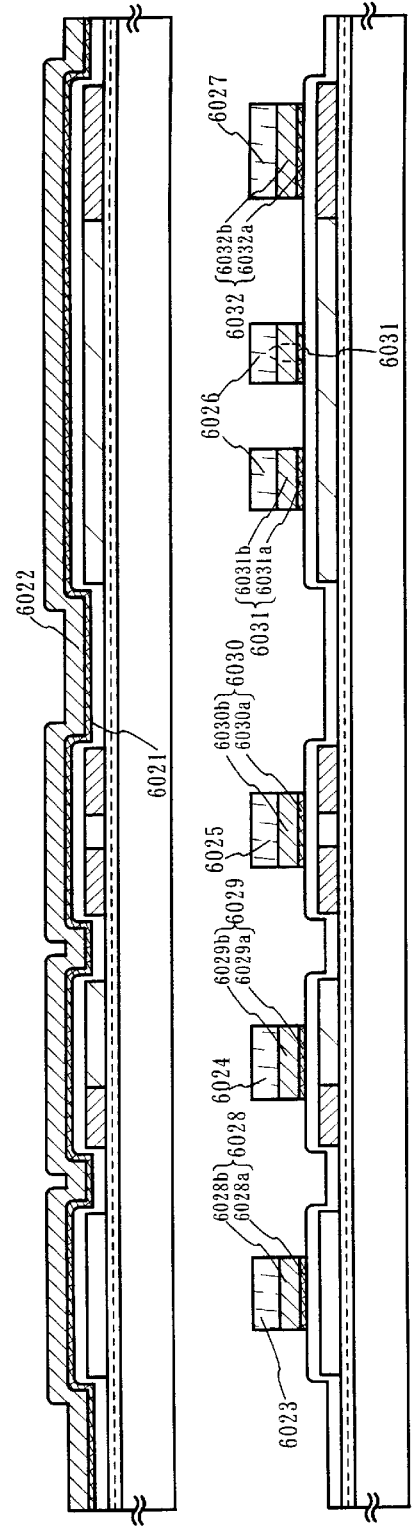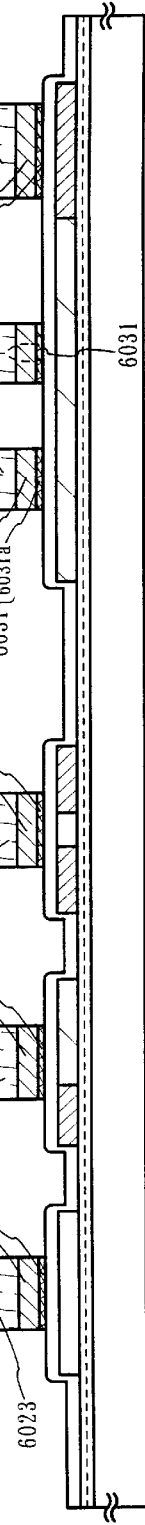

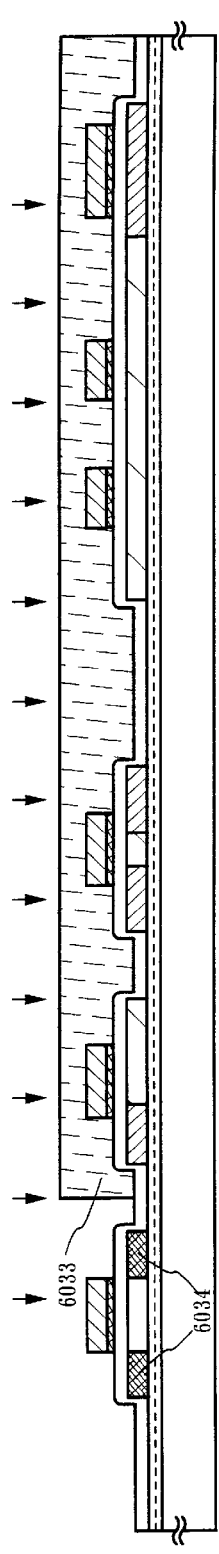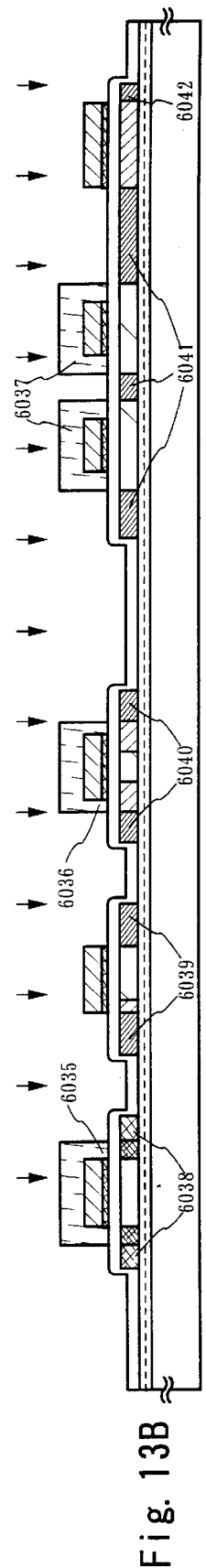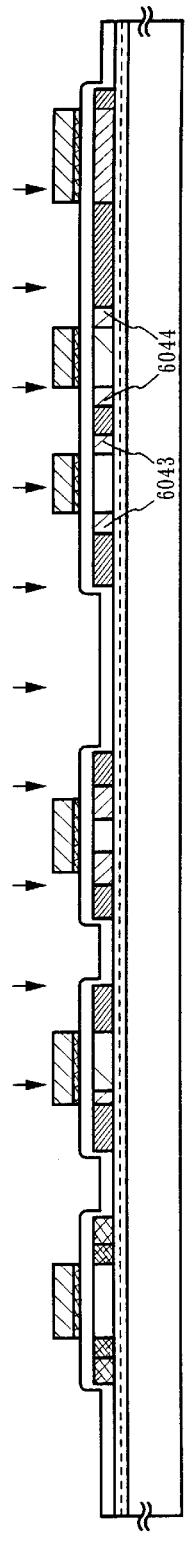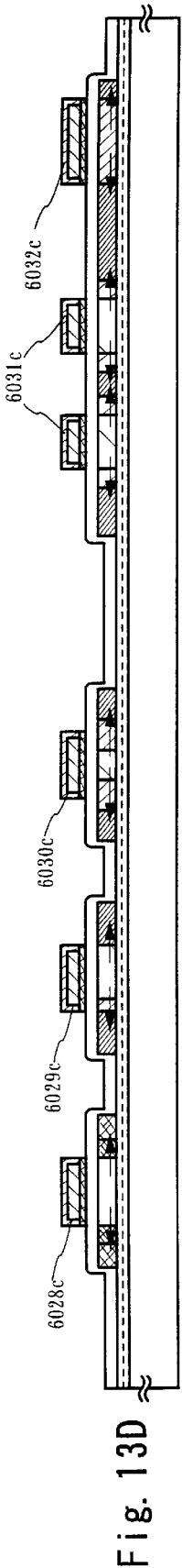

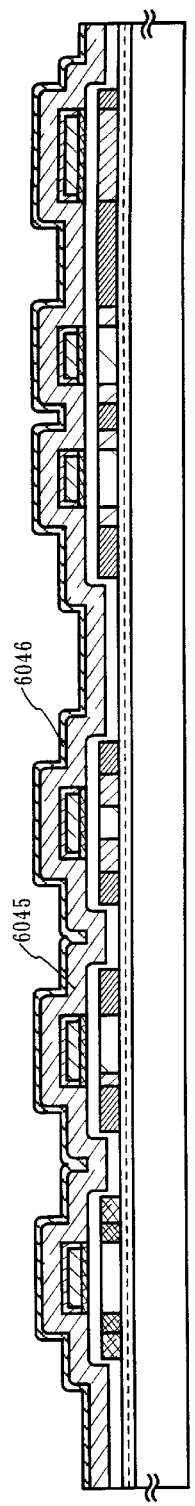
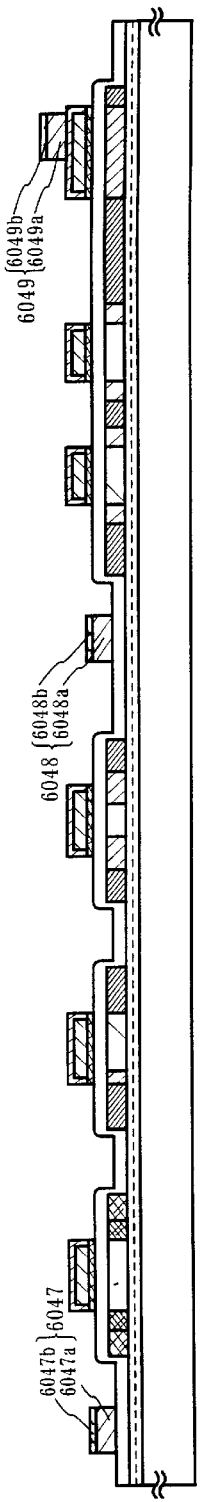
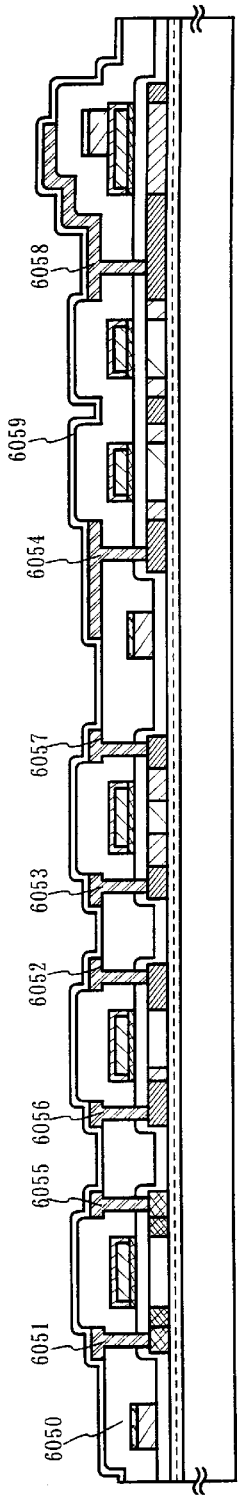
Fig. 14A
Fig. 14B
Fig. 14C

LIQUID CRYSTAL DISPLAY DEVICE IN WHICH A BLACK DISPLAY IS PERFORMED BY A RESET SIGNAL DURING ONE SUB-FRAME

BACKGROUND OF THE INVENTION

1. Field of the Invention

The present invention relates to a liquid crystal display device. The invention also relates to electrooptical apparatus using the liquid crystal display device.

2. Description of the Prior Art

Recently, the technique of fabricating thin film transistors (TFTs) on cheap glass substrates is being rapidly developed. The reason therefore lies in that the demand for active matrix liquid crystal display devices is increasing.

An active matrix liquid crystal display device is constituted in such a manner that a pixel portion is comprised of several hundred thousands to several millions of pixels which are matrix-wise disposed, a pixel TFT is disposed in each of the pixels, and the charges entering and leaving the pixel electrode connected to each pixel TFT are controlled by the switching function of the pixel TFT.

Recently, active matrix liquid crystal display devices are coming into wide use not only as the displays of the so far popularly used notebook type personal computers but also as the displays of desk top type personal computers.

Personal computers are required to display a plurality of pieces of information (including character information and image information) at a time; and thus, efforts have been made to enhance the display ability of personal computers, that is, to enhance the image resolution and the realization of multi-gradation display (desirably, full-color display).

As a result of such enhancement in the display ability of personal computers, active matrix liquid crystal display device as the display device thereof is being improved. Thus, a digital driving type active matrix liquid crystal display device which is easy to effect interface with a personal computer and in which the high speed driving of the drivers can be achieved, and the display ability can thus be enhanced, is drawing attention.

To a digital driving type active matrix liquid crystal display device, digital video data are inputted from data sources such as personal computer. In the active matrix liquid crystal display device with digital drivers, it is necessary to provide a D/A conversion circuit (which is referred to as DAC: Digital-Analog Converter, in some cases). There are various kinds of D/A conversion circuits.

As one of the features of active matrix liquid crystal display device with digital driver, there can be pointed out the fact that the pixels corresponding to one line can be driven at the same time, in other words, line-sequential driving can be realized with relative ease.

Further, in the case of realizing the screen enlargement of the matrix liquid crystal display device and rendering the matrix liquid crystal display device highly precise and minute, the TN mode (twist nematic mode) using the known nematic liquid crystal cannot be said to be sufficient in its response speed.

Thus, recently, a report has been made of active matrix liquid crystal display device using an antiferroelectric mixed liquid crystal which has a V-shaped electrooptical characteristic, that is, which has a response speed faster by two or three figures than that of the nematic liquid crystal. However, in the case this antiferroelectric mixed liquid crystal with a V-shaped electrooptical characteristic is used in an active matrix liquid crystal display device, the "image persistence" is more apt to take place than in the case of using nematic liquid crystal, thus leading to the problem of image deterioration.

SUMMARY OF THE INVENTION

Thus, the present invention has been achieved in view of the above-mentioned problems; the invention realizes a liquid crystal display device in which the deterioration of the image due to image persistence can be prevented.

According to the invention, a liquid crystal display device is provided, which comprises
- a pixel portion in which a plurality of pixel TFTs are matrix-wise disposed,
- a source driver and a gate driver which feed a plurality of the TFTs with picture signals, and
- a ferroelectric liquid crystal material which has substantially no threshold value, characterized in that
- one frame is constituted by a plurality of sub-frames, and,
- during at least one of a plurality of the sub-frames, the display by a reset signal is performed.

According to the invention, there is further provided a liquid crystal display device comprising
- a pixel portion in which a plurality of pixel TFTs are matrix-wise disposed,
- a source driver and a gate driver which feed a plurality of the TFTs with picture signals, and
- a ferroelectric liquid crystal material which has substantially no threshold value, characterized in that
- one frame is constituted by a plurality of sub-frames, and
- during at least one of a plurality of the sub-frames, the display of black by a reset signal is performed.

According to the invention, there is further provided a liquid crystal display device comprising
- a pixel portion in which a plurality of pixel TFTs are matrix-wise disposed,
- a source driver and a gate driver which feed a plurality of the TFTs with picture signals, and
- a ferroelectric liquid crystal material which has substantially no threshold value, characterized in that
- one frame is constituted by n sub-frames (n stands for a natural number of 2 or greater), and
- during m sub-frames of the n sub-frames ($1 \leq m < n$, m stands for a natural number), the display by a reset signal is performed.

According to the invention, there is further provided a liquid crystal display device comprising
- a pixel portion in which a plurality of pixel TFTs are matrix-wise disposed,
- a source driver and a gate driver which feed a plurality of the TFTs with picture signals, and
- a ferroelectric liquid crystal material which has substantially no threshold value, characterized in that
- one frame is constituted by n sub-frames (n stands for a natural number of 2 or greater), and
- during m sub-frames of the n sub-frames ($1 \leq m < n$, m stands for a natural number), the display of black by a reset signal is performed.

According to the invention, there is further provided a liquid crystal display device comprising a pixel portion in which a plurality of pixel TFTs are matrix-wise disposed, a source driver and a gate driver which feed a plurality of the TFTs with picture signals, and a ferroelectric liquid crystal material which has substantially no threshold value, characterized in that the display in one frame is constituted by the displays in a plurality of sub-frames, the displays in a plurality of the sub-frames are formed in such a manner that picture signals which are equal to each other in absolute value but opposite to each other in polarity are applied as a pair to the same pixel TFTs mentioned above, and during at least one of a plurality of the sub-frames, the picture display of black by a reset signal is performed.

According to the invention, there is further provided a liquid crystal display device comprising a pixel portion in which a plurality of pixel TFTs are matrix-wise disposed, a source driver and a gate driver which feed a plurality of the TFTs with picture signals, and a ferroelectric liquid crystal material which has substantially no threshold value, characterized in that the display in one frame is formed by the displays in m sub-frames (m stands for a natural number), during at least n sub-frames of the m sub-frames, the picture displays of black by a reset signal is performed (n stands for a natural number, and m>n), an the displays in (m-n) sub-frames are formed in such a manner that picture signals which are equal to each other in absolute value but opposite to each other in polarity are applied as a pair to the same pixel TFTs mentioned above.

Here, the liquid crystal display device according to the invention will now be described in more detail on the basis of embodiments thereof. However, the liquid crystal display device according to the invention is not limited to the following embodiments.

The liquid crystal display device according to the invention uses a ferroelectric liquid crystal material; particularly an antiferroelectric mixed liquid crystal that has an electrooptical characteristic as shown in FIG. 1.

A liquid crystal, which exhibits an antiferroelectric phase in a certain temperature range, is called an antiferroelectric liquid crystal. Among the mixed liquid crystals containing antiferroelectric liquid crystals, there are those exhibiting an electrooptical response characteristic that the transmittance to an electric field changes continuously, which are called thresholdless antiferroelectric mixed liquid crystals. Among the thresholdless antiferroelectric mixed liquid crystals, there are some which exhibit a V-shaped electrooptical response characteristic; and there is found one whose driving voltage is about ±2.5 V (cell thickness: about 1 μm to 2 μm).

FIG. 1 shows an example of the characteristic of the light transmittance, with respect to the applied voltage, of a thresholdless antiferroelectric mixed liquid crystal that exhibits a V-shaped electrooptical response. On the axis of ordinates in the graph shown in FIG. 1, the transmittance (arbitrary unit) is plotted, while, on the axis of abscissas, the applied voltage is plotted. The transmission axis of the polarizer at the incidence side of the liquid crystal display device is set to be approximately parallel to the direction of the normal of the smectic layer of the thresholdless antiferroelectric mixed liquid crystal which direction approximately coincides with the rubbing direction of the liquid crystal display device. Further, the transmission axis of the polarizer at the emission side is set to be approximately perpendicular (cross-Nicol) to the transmission axis of the polarizer at the incidence side.

In the case of using a thresholdless antiferroelectric mixed liquid as shown in FIG. 1, high-speed driving, low-voltage driving and gradation display become possible.

In the case of the liquid crystal display device according to the present invention, one picture is displayed by displaying a plurality of sub-frames at high speed. To at least one sub-frame of a plurality of the sub-frames displayed, a reset signal is applied. The reset signal can be made to display black on the screen.

FIG. 2 will now be referred to. FIG. 2 shows a driving timing chart of the liquid crystal display device according to the present invention. In the description of the invention, the terms "frame" and "sub-frame" are used. In this connection, the display of one picture is called one frame; and one frame is formed by a plurality of sub-frames. Further, the time necessary for performing the display of one frame is called one frame period (Tf), and a plurality of periods into which one frame period (Tf) is divided are called sub-frame periods (Tsf)

In the liquid crystal display device, which will be described below, one frame is formed by two sub-frames. Here, one frame period (Tf) is constituted of a first sub-frame period ($1^{st}$ Tsf) and a second sub-frame period ($2^{nd}$ Tsf).

First, the display performed during the first frame period will be described. During the first sub-frame period ($1^{st}$ Tsf), a picture signal $D_1$ is fed to the corresponding pixel TFT to perform a picture display. Next, during the second sub-frame period ($2^{nd}$ Tsf), a reset signal R is fed to the corresponding pixel TFT, whereby the display of black is performed.

The display in the next frame period is performed in such a manner that, as in the case of the display in the first frame period, during the first sub-frame period ($1^{st}$ Tsf), a picture signal $D_2$ is fed to the corresponding pixel TFT, whereby a picture display is performed. Next, in the second sub-frame period ($2^{nd}$ Tsf), a reset signal R is fed to the corresponding pixel TFT, whereby the display of black is performed.

Similarly, the display of the successive frames is displayed, whereby the picture is formed.

In this way, in the above-mentioned liquid crystal display device according to the present invention, the display of black is performed during one of the two sub-frames constituting one frame, so that image persistence can be prevented.

Next, FIG. 3 will be referred to. FIG. 3 shows a different driving timing chart of the liquid crystal display device according to the invention.

In the case of the liquid crystal display device according to the invention, which will be described here, one frame is formed of four sub-frames. Here, one frame period (Tf) is shown as formed by a first sub-frame period ($1^{st}$ Tsf), a second sub-frame period ($2^{nd}$ Tsf), a third sub-frame period ($3^{rd}$ Tsf) and a fourth sub-frame period ($4^{th}$ Tsf).

First, the display performed during the first frame period will be described. During the first sub-frame period ($1^{st}$ Tsf), the picture signal $D_1$ is fed to the corresponding pixel TFT, whereby the display of a picture is performed. Next, during the second sub-frame period ($2^{nd}$ Tsf), a reset signal R is fed to the corresponding pixel TFT, whereby the display of black is performed. Next, during the third sub-frame period ($3^{rd}$ Tsf), the same picture signal $D_1$ as the signal fed to the corresponding pixel TFT during the first sub-frame period is fed to the corresponding pixel TFT, whereby the display of a picture is performed. Then, during the fourth sub-frame period ($4^{th}$ Tsf), the reset signal R is fed to the corresponding pixel TFT, whereby the display of black is performed.

In this way, in the liquid crystal display device according to the invention, when the picture signal other than the reset signal is fed during the respective sub-frames of the same frame period, one and the same picture signal is fed.

The display during the next frame period is carried out in the same manner that, as in the case of the display during the first frame period, during the first sub-frame period ($1^{st}$ Tsf), a picture signal $D_2$ is fed to the corresponding pixel TFT, whereby the display of a picture is performed. Next, during the second sub-frame period ($2^{nd}$ Tsf), a reset signal R is fed to the corresponding pixel TFT, whereby the display of black is performed. Then, during the third sub-frame period ($3^{rd}$ Tsf), the same picture signal $D_2$ as the signal fed to the corresponding pixel TFT during the first sub-frame period is fed to the corresponding pixel TST, whereby the display of a picture is performed. Next, during the fourth sub-frame period ($4^{th}$ Tsf), the reset signal R is fed to the corresponding pixel TFT, whereby the display of black is performed.

In the same way, the display in the continuous frames is carried out to form pictures.

As mentioned above, in the liquid crystal display device according to the invention, during at least one of a plurality of sub-frames constituting one frame, a reset signal is fed to perform the display of black, so that the occurrence of image persistence can be prevented.

The above-mentioned aspect of the invention has been described with respect to the case where one frame is formed of two sub-frames, the case where one frame is formed of four sub-frames and the case where the feed of the picture signal and the feed of the reset signal are carried out by turns, however, the present invention is not limited to these cases. In the liquid crystal display device according to the invention, one frame can be constituted of n sub-frames ($1 \leq m < n$, m stands for a natural number), and the feed of the picture signal and the feed of the reset signal can be arbitrarily set.

BRIEF DESCRIPTION OF THE DRAWINGS

FIGS. 11A–11D is a diagram showing some exemplary fabrication steps for fabricating the liquid crystal display device according to the invention.

FIGS. 12A–12D is a diagram showing some exemplary fabrication steps for fabricating the liquid crystal display device according to the invention.

FIGS. 13A–13D is a schematic diagram showing some exemplary fabrication steps for fabricating the liquid crystal display device according to the invention.

FIGS. 14A–14C is a diagram showing some exemplary fabrication steps for fabricating the liquid crystal display device according to the invention.

DESCRIPTION OF THE PREFERRED EMBODIMENTS

Here, the liquid crystal display device according to the invention will be described in more detail, referring to embodiments thereof. However, the liquid crystal display device according to the invention is not limited to the following embodiments.

Embodiment 1

Figure 1:
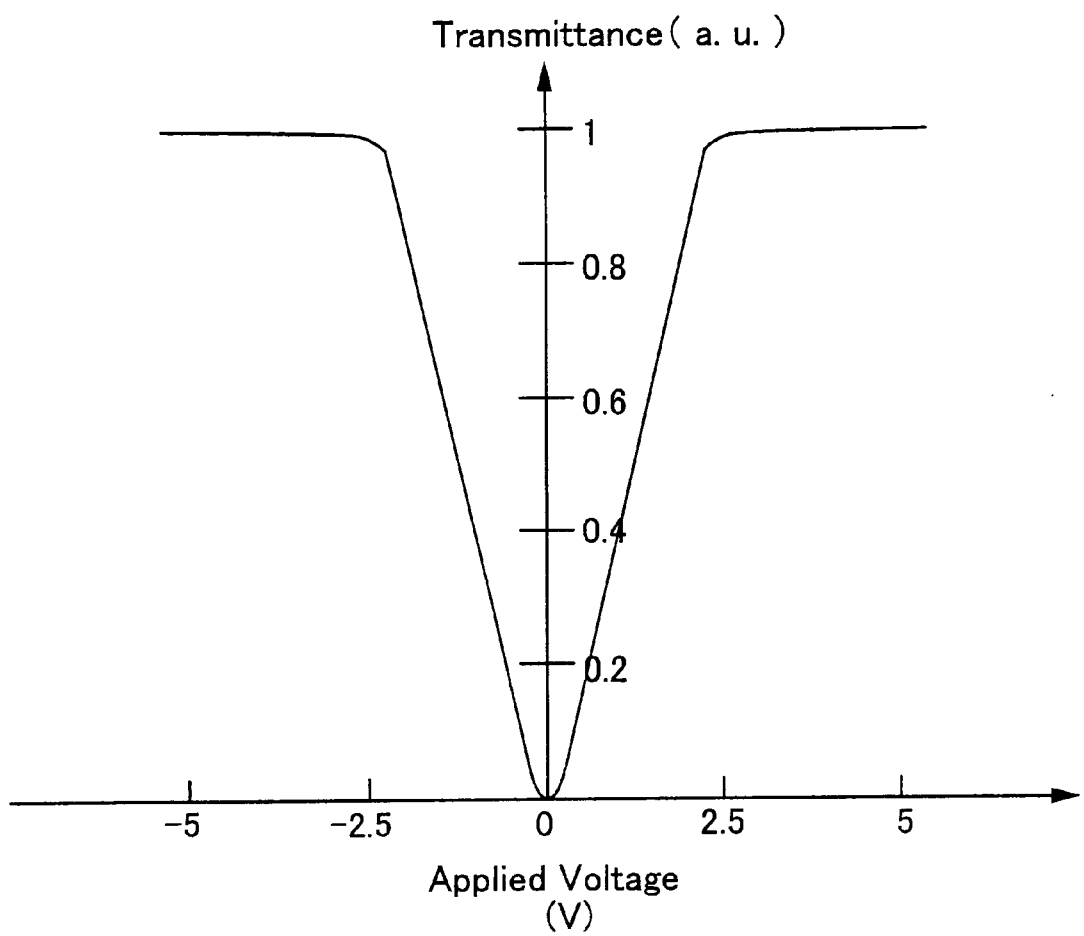
FIG. 1 is a graph showing the electrooptical characteristic of a thresholdless antiferroelectric mixed liquid crystal.
Figure 2:
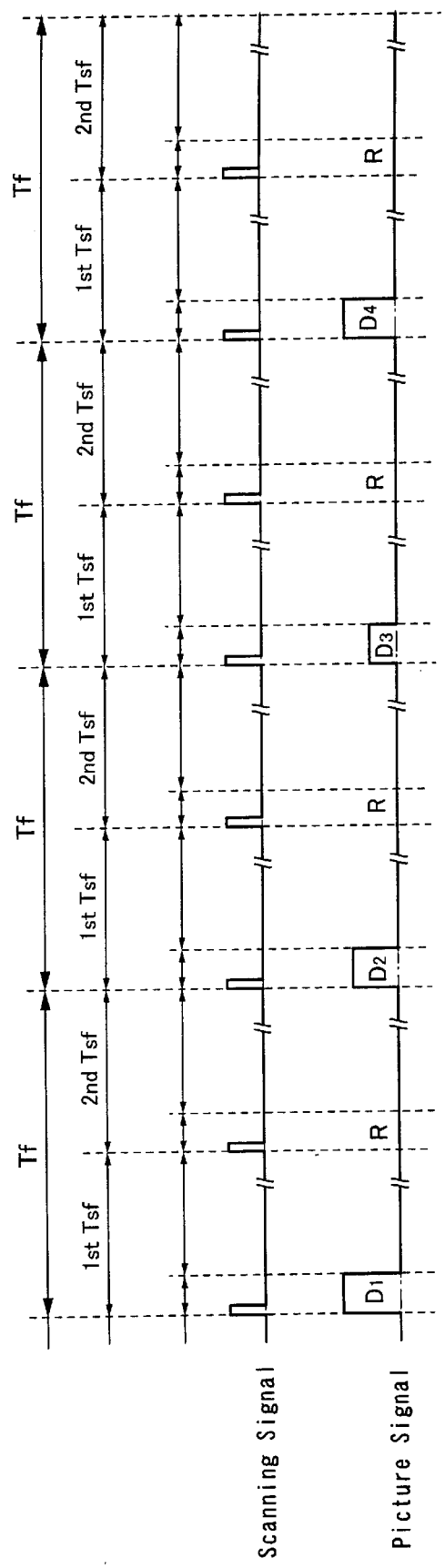
FIG. 2 is a driving timing chart of the liquid crystal display device according to the invention.
Figure 3:
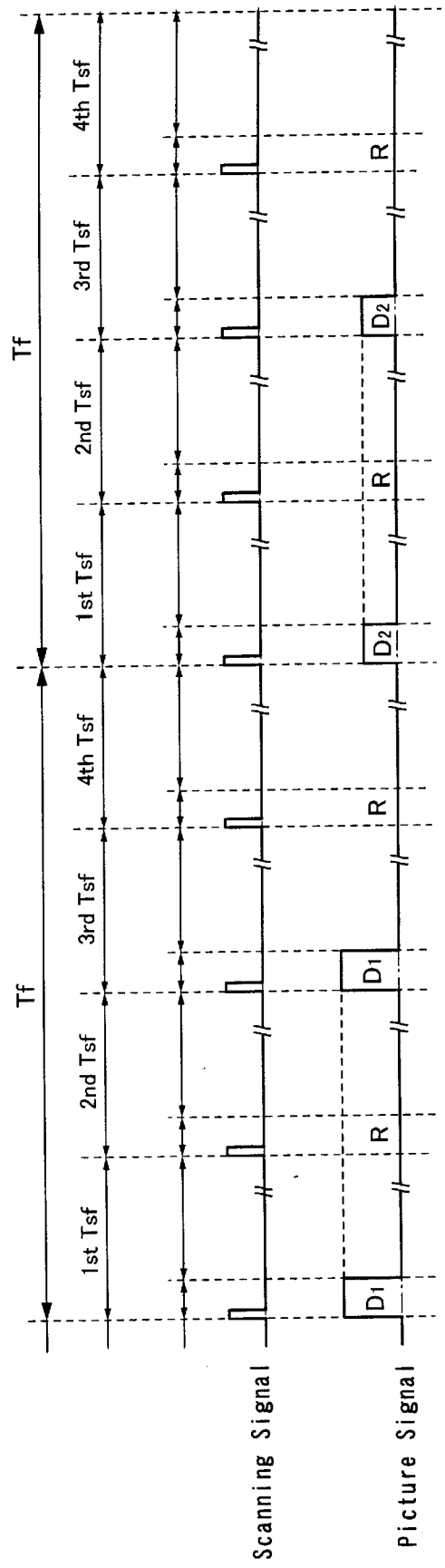
FIG. 3 is a driving timing chart of the liquid crystal display device according to the invention.
Figure 4:
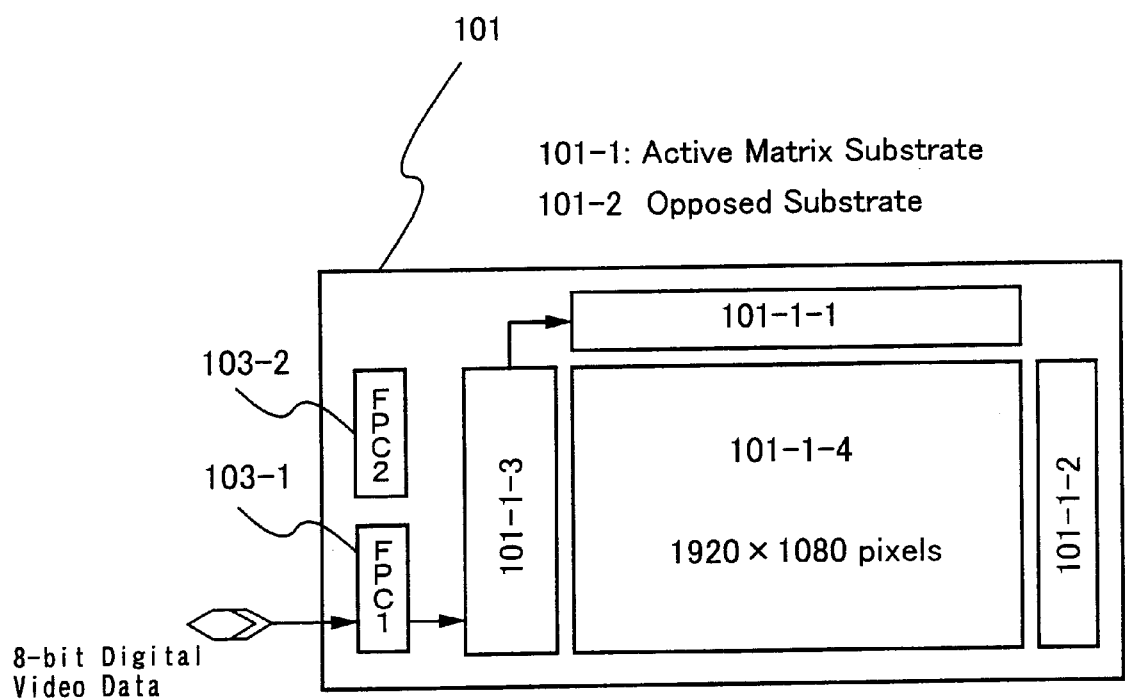
FIG. 4 is a diagram showing an outline of the constitution of an embodiment of the liquid crystal display device according to the invention.

FIG. 4 will now be referred to. FIG. 4 shows an outline of the constitution of the liquid crystal display device according to this embodiment. The reference numeral 101 denotes a liquid crystal display device that has digital drivers. The liquid crystal display device 101 includes an active matrix substrate 101-1 and an opposite substrate 101-2 (not shown). The active matrix substrate 101-1 includes a source driver 101-1-1, a gate driver 101-1-2, a digital video data division circuit 101-1-3 and a pixel portion 101-1-4 in which a plurality of pixel TFTs are matrix-wise disposed. The source driver 101-1-1 and the gate driver 101-1-2 drive a plurality of the pixels in the pixel portion. Further, the opposite substrate 101-2 includes an opposite electrode 101-2-1 (not shown). Numerals 103-1 and 103-2 denote FPC (Flexible Print Circuit) terminals; and, to these FPC terminals, various signals are inputted from the outside.

Figure 5:
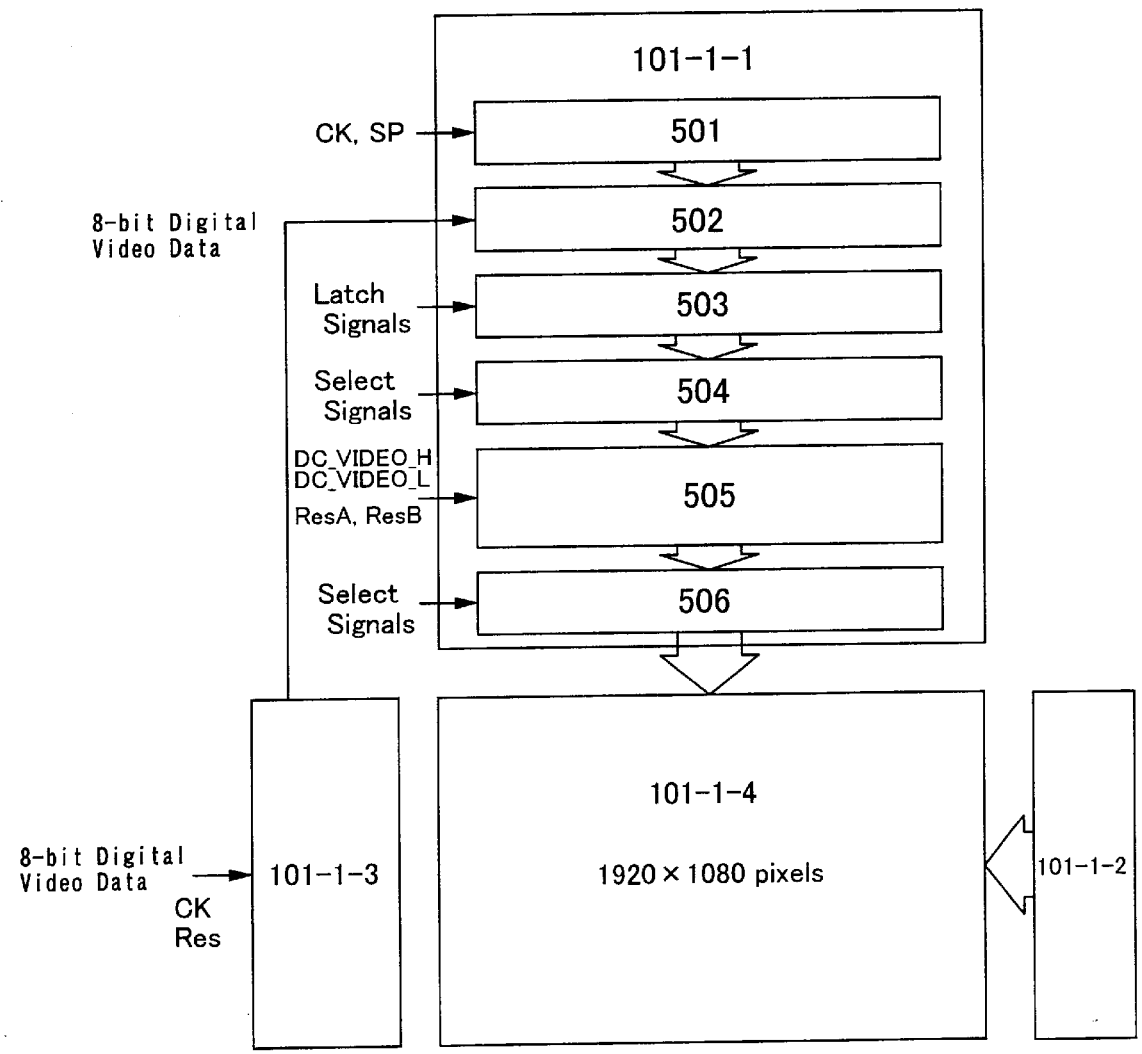
FIG. 5 is a diagram showing the circuit arrangement of the pixel portion, the source driver and the gate driver in an embodiment of the liquid crystal display device according to the invention.

Next, FIG. 5 will be referred to. FIG. 5 is a diagram showing an outline of the constitution of the liquid crystal display device according to this embodiment, wherein the source driver of the liquid crystal display device is shown particularly in detail. Numeral 101-1-1 denotes the source driver. Numeral 101-1-2 denotes the gate driver. Numeral 101-1-4 denotes the pixel portion. Numeral 101-1-3 denotes the digital video data division circuit (SPC: Serial-to-Parallel Conversion Circuit).

The source driver 101-1-1 includes a shift register circuit (240 stages×2 shift register circuits) 501, a latch circuit 1 (960×8 digital latch circuits) 502, a latch circuit 2 (960×8 digital latch circuits) 503, a selector circuit 1 (240 selector circuits) 504, a D/A conversion circuit (240 DACs) 505 and a selector circuit 2 (240 selector circuits) 506. The source driver 101-1-1 further includes a buffer circuit and a level shifter circuit (neither of them is shown). Further, for convenience of description, in the D/A conversion circuit 505, a level shifter circuit is included.

Numeral 101-1-2 denotes the gate driver, which includes a shift register circuit, a buffer circuit, and a level shifter circuit (neither of them is shown).

The pixel portion 101-1-4 has 1920×1080 (the number of pixels in width×the number of pixels in length) pixels. In each of the pixels, a pixel TFT is disposed; and, to the source region of each pixel TFT, a source signal line is electrically connected, and, to the gate electrode thereof, a gate signal line is electrically connected. Further, to the drain region of each pixel TFT, a pixel electrode is electrically connected. Each of the pixel TFTs controls the feed of a picture signal (gradation voltage) to the pixel electrode electrically connected to each pixel TFT. Each of the pixel electrodes is fed with the picture signal (gradation voltage), so that a voltage is applied to the liquid crystal sandwiched between each pixel electrode and the opposite electrode, whereby the liquid crystal is driven.

Here, the operation of and the signal flow in the active matrix liquid crystal display device according to this embodiment will be described.

First, the operation of the source driver will be described. To the shift register circuit 501, a clock signal (CK) and a start pulse (SP) are inputted. The shift register circuit 501 successively generates timing signals on the basis of the clock signal (CK) and the start pulse (SP) and successively feed the timing signals to the circuit at the following stage through a buffer circuit and the like (not shown).

The timing signals fed from the shift register circuit 501 are buffered by the buffer circuit and the like. To the source signal lines, which are fed with the timing signals, a large number of circuits or elements are connected; and thus, the load capacitance (parasitic capacitance) of the source signal lines is large. In order to prevent the leading edge of the timing signals from being blunted due to the fact that this load capacitance is large, this buffer circuit is provided.

The timing signals thus buffered by the buffer circuit are fed to the latch circuit 1 (502). The latch circuit 1-(502) comprises 960 stages of latch circuits for processing 8-bit digital video data. The latch circuit 1 (502), when the timing signals are inputted thereto, successively takes in and holds the 8-bit digital video data fed from the digital video data division circuit 101-1-3.

The length of time for completing the writing of the digital video data into the latch circuits at all the stages of the latch circuit 1 (502) is called a line period. That is, the time interval ranging from the point of time when the writing of the digital video data into the latch circuit at the leftmost-side stage in the latch circuit 1 (502) is started to the point of time when the writing of the digital video data into the latch circuit at the rightmost-side stage is completed, is the line period. In actuality, the period comprising the above-mentioned line period plus the horizontal fly-back time is called the line period in some cases.

After the completion of one line period, a latch signal is fed to the latch circuit 2 (503) in step with the operating timing of the shift register circuit 501. At this moment, the digital video data written and held in the latch circuit 1 (502) are transmitted to the latch circuit 2 (503) all at once and written into the latch circuits at the latch circuits at all the stages in the latch circuit 2 (503) and held there.

Into the latch circuit 1 (502) which has finished the transmission of the digital video data to the latch circuit 2 (503), the writing of the digital video data fed again from the digital video data division circuit is successively performed on the basis of the timing signals from the shift register circuit 501.

During this second one-line period, the digital video data that are written and held in the latch circuit 2 (503) are successively selected by the selector circuit 1 (504) and fed to the D/A conversion circuit 505. In the selector circuit 1 (504) according to this embodiment, one selector circuit corresponds to four source signal lines.

As this selector circuit, the selector circuit disclosed in Japanese Patent Application No. 286098/1997 filed by the present applicant may also be used.

The 8-bit digital video data from the latch circuit 2 (503) which data have been selected by the selector circuit 504 are fed to the D/A conversion circuit 505. Here, the D/A conversion circuit used in this embodiment will be described by referring to FIG. 7.

Figure 7:
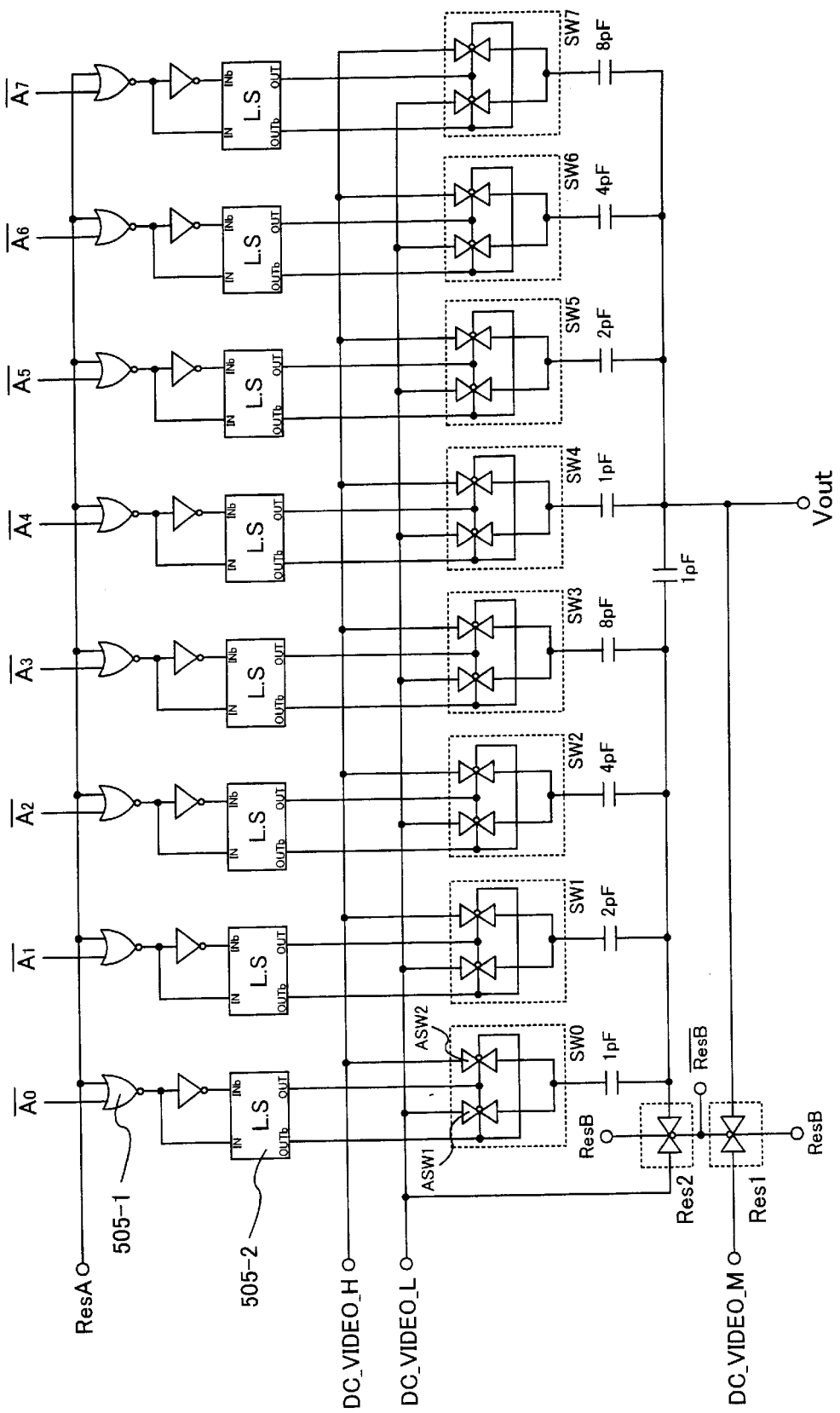
FIG. 7 is a diagram showing the circuit arrangement of the D/A conversion circuit in an embodiment of the liquid crystal display device according to the invention.

FIG. 7 shows a circuit diagram of the D/A conversion circuit according to this embodiment. The D/A conversion circuit according to this embodiment has level shifters (L.S) 505-2, however, can also be designed by omitting these level shifters. Each of the level shifter circuits is constituted in such a manner that, when a signal Lo is inputted to an input IN and a signal Hi is inputted to an input INb, a high potential power supply VddHI is outputted from an output OUT and a low potential power supply Vss is outputted from an output OUTb. Further, when the signal Hi is inputted to the input IN and the signal Lo is inputted to the input INb, the high potential power supply Vss is outputted from the output OUT and the low potential power supply VddHI is outputted from the output OUTb.

In the D/A conversion circuit according to this embodiment, the inverted data (referred to as inversions A0 to A7, here) of the digital video data A0 to A7 are inputted to one-side inputs of NOR circuits 505-1. To the other-side inputs of these NOR circuits 505-1, a reset pulse A (ResA) is inputted. This reset pulse A is inputted during the reset period TR of the D/A conversion circuit. In the case of this embodiment, the digital video data (the inversions A0 to A7) are inputted to the NOR circuits 505-1 even during the reset period TR, however, while the reset pulse ResA is being inputted to the NOR circuits 505-1, the digital video data are not outputted from the NOR circuits.

The D/A conversion circuit may also be constituted in such a manner that the NOR circuits are omitted, and, after the termination of the reset period TR, the digital video data (the inversions A0 to A7) are inputted.

After the termination of the reset period TR, a data-writing period TE begins; and the 8-bit digital video data are raised in the voltage level thereof by the level shifter circuit and inputted to switch circuits SW0 to SW7.

Each of the switch circuits SW0 to SW7 is constituted of two analog switches ASW1 and ASW2. One end of each ASW1 is connected to a DC_VIDEO_L, while the other end thereof is connected to one end of the ASW2 and also to a capacitor. Further, one end of each ASW2 is connected to a DC_VIDEO_H, while the other end thereof is connected to one end of the ASW1 and also to the capacitor (1 pF, 2 pF, 4 pF, 8 pF, 1 pF, 2 pF, 4 pF, 8 pF). One end of each capacitor is connected to two analog switches, while the other end thereof is connected to a reset switch 2 (Res2). Further, one end of a reset switch (Res1) is connected to a DC_VIDEO_M, while the other end thereof is connected to one end of a capacitor corresponding to the high-order bit. To the reset switches Res1 and Res2, a reset pulse (ResB) and an inverted reset pulse (inversion ResB) are inputted.

To the connection point between a circuit corresponding to each higher-order bit and a circuit corresponding to each lower-order bit, there is provided a capacitance (1 pF). All the above-mentioned capacitances in this embodiment are not limited to their values.

The D/A conversion circuit 505 converts the 8-bit digital video data into a picture signal (gradation voltage), which is successively fed to the source signal lines selected by the selector circuit 2 (506).

The picture signal fed to the source signal lines is fed to the source regions of the pixel TFTs in the pixel portion, which are connected to the source signal lines.

In the gate driver 101-1-2, the timing signal (scanning signal) from a shift register (not shown) is fed to a buffer circuit (not shown) and fed to the corresponding gate signal line (scanning line). To the gate signal lines, the gate electrodes of the pixel TFTs corresponding to one line are connected; and the pixel TFTs corresponding to one line must all be turned on simultaneously, so that, as the buffer circuit, a buffer circuit with a large current capacity is used.

In this way, by the scanning signal from the gate driver, the switching of the corresponding pixel TFT is performed, whereby the picture signal (gradation voltage) from the source driver is fed to the pixel TFTs to thereby drive the liquid crystal molecules.

Numeral 101-1-3 denotes the digital video data division circuit (SPC: Serial-to Parallel Conversion Circuit). The digital video data division circuit 101-1-3 is a circuit for lowering the frequency of the digital video data inputted from the outside to 1/x (x stands for a natural number of 2 or greater). By dividing the digital video data inputted from the outside, the frequency of the signal necessary for the operation of the driving circuit can also be lowered to 1/x.

Figure 6:
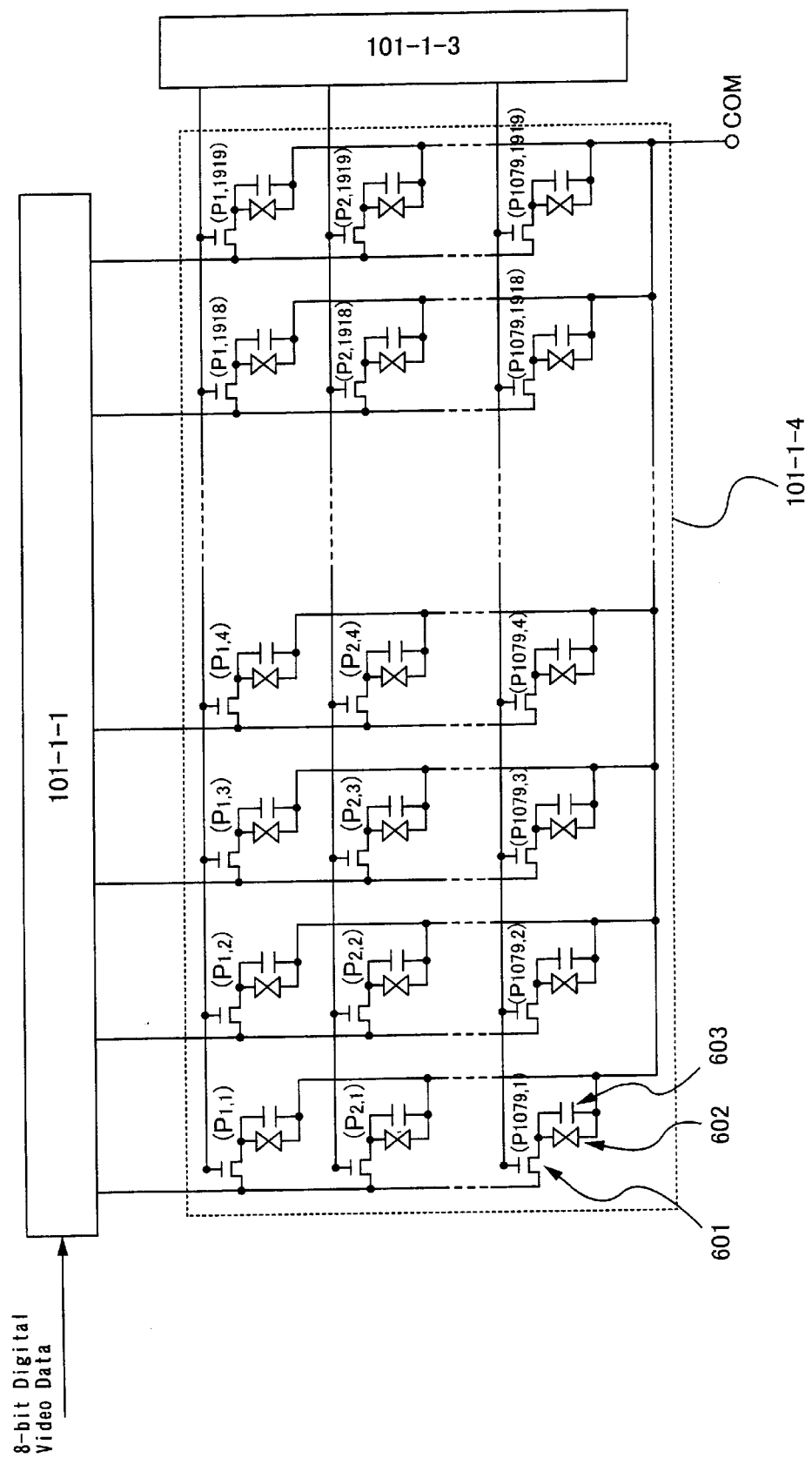
FIG. 6 is a diagram showing the circuit arrangement of the pixel portion, the source driver and the gate driver in an embodiment of the liquid crystal display device according to the invention.

Here, the circuit arrangement of the liquid crystal display device 101 according to this embodiment and, more particularly, the constitution of the pixel portion 101-1-4 will be described by referring to FIG. 6.

In this embodiment, the pixel portion 101-1-4 has (1920× 1080) pixels. To the respective pixels, symbols P1,1, P2,1, . . . , P1079,1919, etc. are put for convenience of description. Further, each of the respective pixels has a pixel TFT 601 and a storage capacitor 603. Between the active matrix substrate and the opposite substrate, a liquid crystal is sandwiched; as the liquid crystal 602, the liquid crystal corresponding to each pixel is symbolically shown. COM denotes a common voltage terminal, which is connected to the opposite electrode and one end of each storage capacitor.

In the liquid crystal display device according to this embodiment, the so-called line-sequential driving is performed according to which the pixels (for example P1,1, P1,2, . . . , and P1,1919) corresponding to one line are driven simultaneously. In other words, the picture signal is written simultaneously into all the pixels corresponding to one line.

Figure 8:
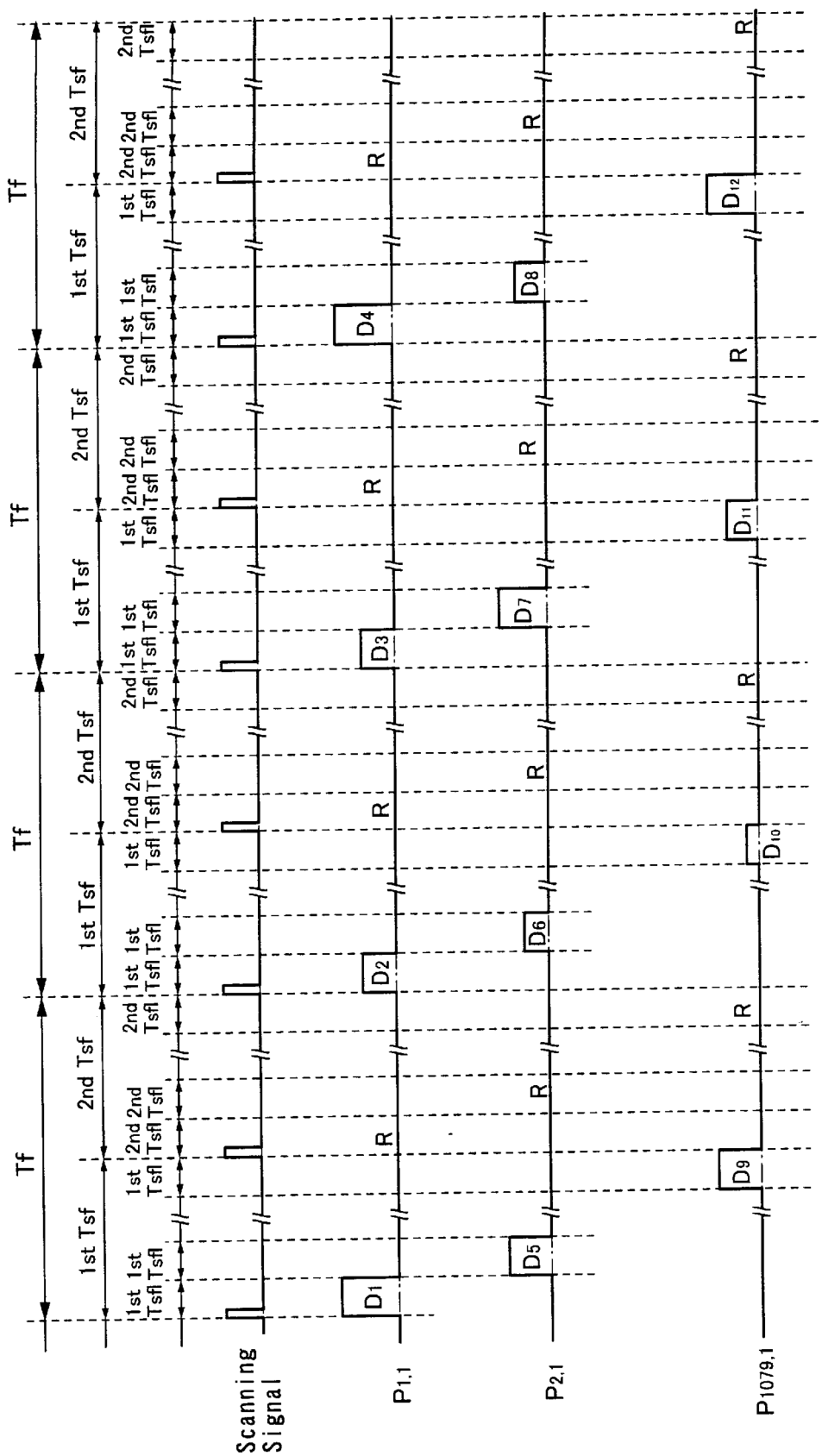
FIG. 8 is a driving timing chart of the liquid crystal display device according to the invention.

Here, the display method performed by the liquid crystal display device according to this embodiment will be described. FIG. 8 will now be referred to. FIG. 8 shows a driving timing chart of the liquid crystal display device according to this embodiment. In the liquid crystal display device according to the present invention, which will be described here, one frame is formed of two sub-frames. Here, one frame period (Tf) is constituted of a first sub-frame period ($1^{st}$ Tsf) and a second sub-frame period ($2^{nd}$ Tsf).

In FIG. 8, the pixel P1,1, the pixel P2,1 and the pixel P1079,1 are shown by way of example.

First, the display in the first frame period will be described. During the first sub-frame period ($1^{st}$ Tsf), a scanning signal is inputted to the gate driver; and, during the first sub-frame line period ($1^{st}$ Tsfl), digital video data are converted into a picture signal by the D/A conversion circuit and written into the pixel P1,1 to the pixel P1,1919. Thereafter, during the next sub-frame line period, the digital video data are converted into a picture signal and written into the pixel P2,1 to the pixel P2,1919. Thereafter, into the respective pixels, the picture signal is successively written, and the picture signal is written into the pixel P1079,1 to the pixel P1079,1919 corresponding to the last one line, with which the first sub-frame period terminates.

Next, the second sub-frame period ($2^{nd}$ Tsf) begins. During the second sub-frame period ($2^{nd}$ Tsf), a scanning signal is inputted to the gate driver; and, during the second sub-frame line period ($2^{nd}$ Tsfl), the reset signal resulting from converting the digital video data by the D/A conversion circuit is written into the pixel P1,1 to the pixel P1,1919, whereby the display of black is performed. Thereafter, during the next sub-frame line period, the reset signal resulting from converting the digital video data by the D/A conversion circuit is written into the pixel P2,1 to the pixel P2,1919, whereby the display of black is performed. Thereafter, the reset signal is written into the respective pixels one after another, and, into the pixel P1079,1 to the pixel P1079,1919 corresponding to the final one line, the reset signal is written, whereby the display of black is performed. Thus, the second sub-frame period terminates.

The display in the next frame period is carried out in such a manner that, as the display in the first frame period, during the first sub-frame period ($1^{st}$ Tsf), a picture signal $D_2$ is fed to the corresponding pixel TFT, whereby picture display is performed. Next, during the second sub-frame period ($2^{nd}$ Tsf), the reset signal R is fed to the corresponding pixel TFT, whereby the display of black is performed.

In the same way, the display in the successive frames is performed, whereby an image is formed.

In this way, in the above-mentioned liquid crystal display device according to the present invention, in one of the two sub-frames constituting one frame, the display of black is performed, so that image persistence can be prevented.

Embodiment 2

This embodiment relates to the liquid crystal display device of the present invention based on a display method different from the above-mentioned display method of Embodiment 1. The constitution of the liquid crystal display device according to this embodiment is identical with that of Embodiment 1, so that reference can be made to Embodiment 1.

Figure 9:
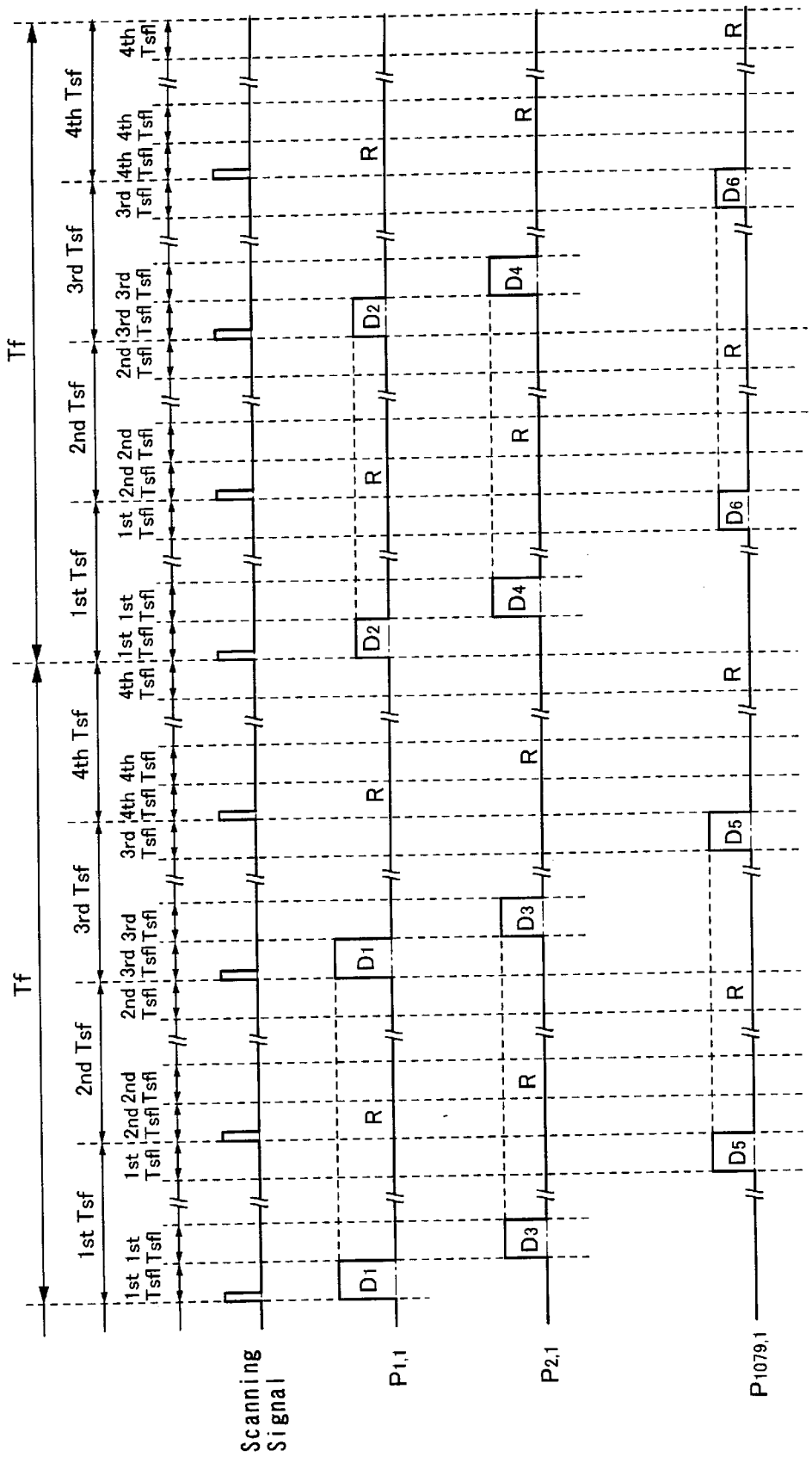
FIG. 9 is a driving timing chart of the liquid crystal display device according to the invention.

The display method of the liquid crystal display device according to this embodiment will be described. FIG. 9 will now be referred to. FIG. 9 shows a driving timing chart of the liquid crystal display device according to this embodiment. In the liquid crystal display device of the present invention, which will be described here, one frame is formed of four sub-frames. Here, one frame period (Tf) is constituted of a first sub-frame period ($1^{st}$ Tsf), a second sub-frame period ($2^{nd}$ Tsf), a third sub-frame period ($3^{rd}$ Tsf) and a fourth sub-frame period ($4^{th}$ Tsf).

In FIG. 9, the pixel P1,1, the pixel P2,1 and the pixel P1079,1 are shown by way of example.

First, the display in the first frame period will be described. During the first sub-frame period ($1^{st}$ Tsf), a scanning signal is inputted to the gate driver; and, during the first sub-frame line period ($1^{st}$ Tsfl), the digital video data are converted into a picture signal by the D/A conversion circuit and written into the pixel P1,1 to the pixel P1,1919. Into the pixel P1,1 shown in FIG. 9, a picture signal $D_1$ is written. Thereafter, during the next sub-frame line period, the digital video data are converted into a picture signal by the D/A conversion circuit and written into the pixel P2,1 to the pixel P2,1919. Into the pixel P2,1 shown in FIG. 9, a picture signal $D_3$ is written. Thereafter, picture signals are successively written into the respective pixels, and, into the pixel P1079,1 to the pixel P1079,1919 corresponding to the last one line, a picture signal is written. Into the pixel P1079,1 shown in FIG. 9, a picture signal $D_5$ is written. In this way, the first sub-frame period terminates.

Next, the second sub-frame period ($2^{nd}$ Tsf) begins. During the second sub-frame period ($2^{nd}$ Tsf), the scanning signal is inputted to the gate driver, and, during the second sub-frame line period ($2^{nd}$ Tsfl), the reset signal resulting from converting the digital video data by the D/A conversion circuit is written into the pixel P1,1 to the pixel P1,1919, whereby the display of black is performed. Thereafter, during the next sub-frame line period, the reset signal resulting from converting the digital video data by the D/A conversion circuit is written into the pixel P2,1 to the pixel P2,1919, whereby the display of black is performed. Thereafter, the reset signal is written into the respective pixels one after another, and, into the pixel P1079,1 to the pixel P1079,1919 corresponding to the last one line, the reset signal is written, whereby the display of black is performed. In this way, the second sub-frame period terminates.

Next, the third sub-frame ($3^{rd}$ Tsf) begins. During the third sub-frame period ($3^{rd}$ Tsf), the scanning signal is inputted to the gate driver, and, during the third sub-frame line period ($3^{rd}$ Tsfl), the digital video data are converted into a picture signal by the D/A conversion circuit and written into the pixel P1,1 to the pixel P1,1919. Into the pixel P1,1 shown in FIG. 9, the same picture signal $D_1$ as the picture signal written during the first sub-frame period is written. Thereafter, during the next sub-frame line period, the digital video data are converted into a picture signal by the D/A conversion circuit and written into the pixel P2,1 to the pixel P2,1919. Into the pixel P2,1 shown in FIG. 9, the same picture signal $D_3$ as the picture signal written during the first sub-frame period is written. Thereafter, picture signals are written into the respective pixels, and, into the pixels P1079,1 to P1079,1919 corresponding to the last one line, a picture signal is written. Into the pixel P1079,1 shown in FIG. 9, the same picture signal $D_5$ as the picture signal written during the first sub-frame period is written. Thus, the first sub-frame period terminates.

Next, the fourth sub-frame period ($4^{th}$ Tsf) begins. During the fourth sub-frame period ($4^{th}$ Tsf), the scanning signal is inputted to the gate driver, and, during the fourth sub-frame line period ($4^{th}$ Tsfl), the reset signal resulting from converting the digital video data by the D/A conversion circuit is written into the pixels P1,1 to P1,1919, whereby the display of black is performed. Thereafter, during the next sub-frame line period, the reset signal resulting from converting the digital video data by the D/A conversion circuit is written into the pixels P2,1 to P2,1919, whereby the display of black is performed. Thereafter, the reset signal is written into the respective pixels successively; and, into the pixels P1079,1 to P1079,1919 corresponding to the last one line, the reset signal is written, whereby the display of black is performed. Thus, the fourth sub-frame period terminates.

In this way, the first frame period terminates. Thereafter, the next frame period begins; and the display in the first to fourth sub-frames is performed.

In the same way, the display in the successive frames is performed, whereby an image is formed.

As stated above, in the above-described liquid crystal display device according to the present invention, the display of black is performed in two of the four sub-frames, so that image persistence can be prevented.

Embodiment 3

Figure 10:
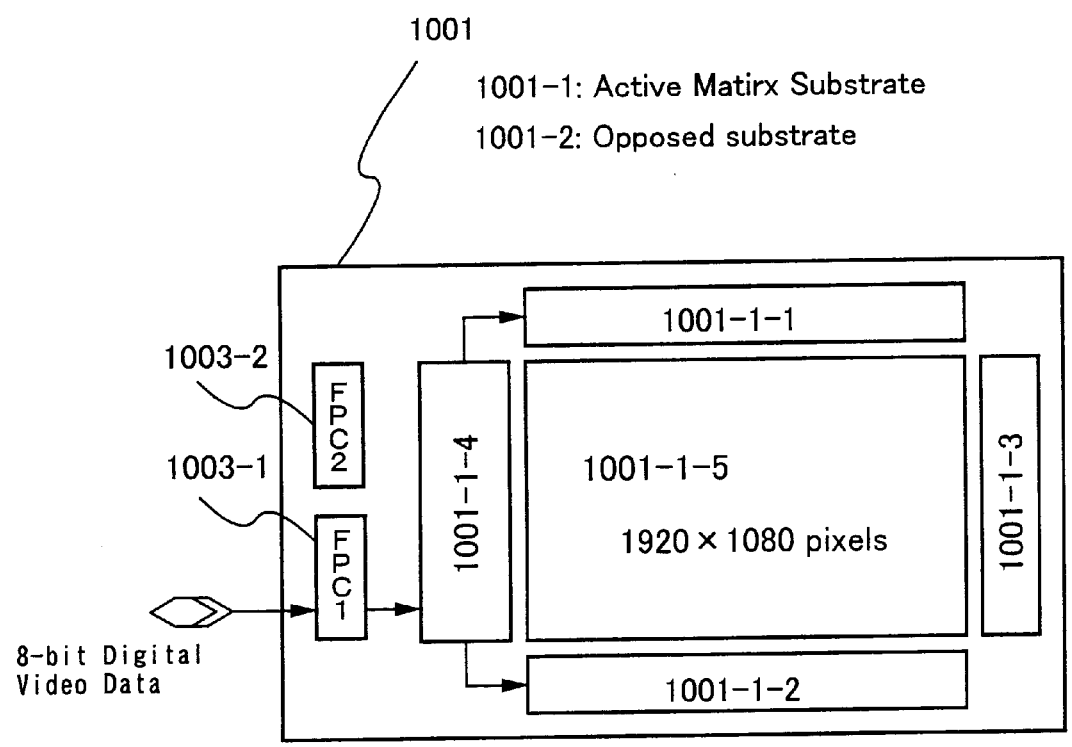
FIG. 10 is a diagram showing an outline of the constitution of an embodiment of the liquid crystal display device according to the invention.

FIG. 10 will now be referred to. FIG. 10 is a diagram showing an outline of the constitution of the liquid crystal display device according to this embodiment. Numeral 1001 denotes a liquid crystal display device that has digital drivers. The liquid crystal display device 1001 includes an active matrix substrate 1001-1 and an opposite substrate 1001-2 (not shown). The active matrix substrate 1001-1 includes a source driver 1001-1-1, a source driver 1001-1-2, a gate driver 1001-1-3, a digital video data division circuit 1001-1-4 and a pixel portion 1001-1-5 in which a plurality of pixel TFTs are matrix-wise disposed. The source driver 1001-1-1, the source driver 1001-1-2 and the gate driver 1001-1-3 drive a plurality of the pixel TFTs in the pixel portion. Further, the opposite substrate 1001-2 includes an opposite electrode 1001-2-1 (not shown). Numerals 1003-1 and 1003-2 denote FPC terminals; to these FPC terminals, various signals are inputted from the outside.

The source driver 1001-1-1 drives the pixels connected to the odd-numbered source signal lines in the pixel portion, while the source driver 1001-1-2 drives the pixels connected to the even-numbered source signal lines.

The constitution of the other portions is identical with that of Embodiment 1.

Embodiment 4

Figure 22:
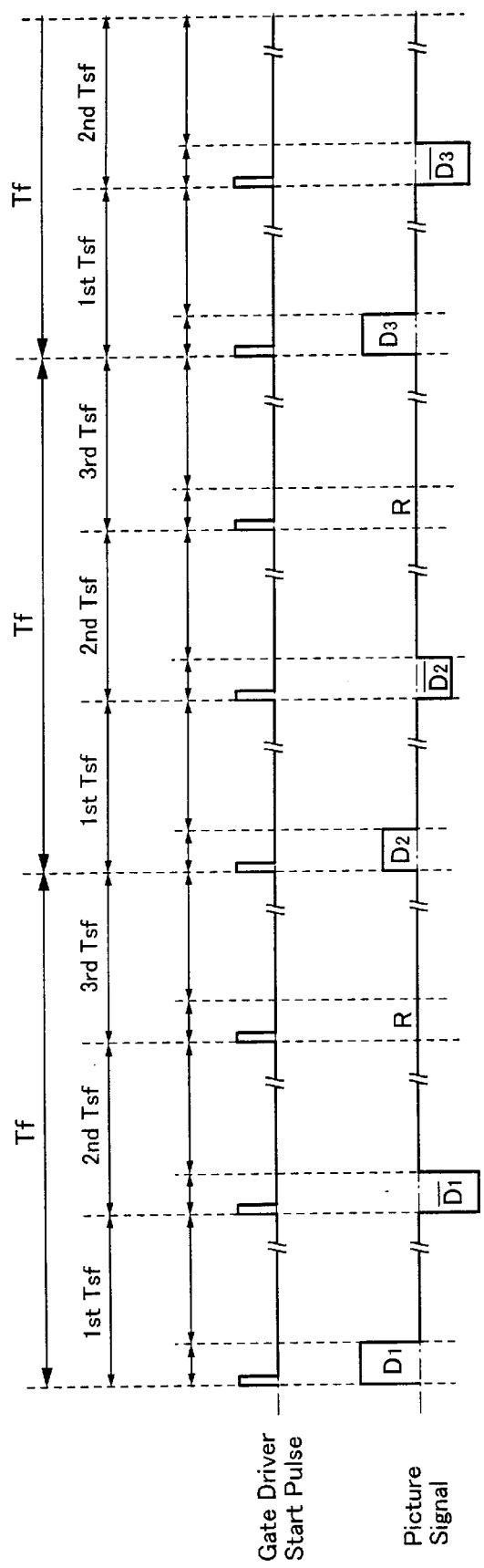
FIG. 22 is a driving timing chart of the liquid crystal display device according to the invention.

FIG. 22 will now be referred to. FIG. 22 shows a driving timing chart of the liquid crystal display device according to this embodiment. In the description of the present invention, the terms "frame" and "sub-frame" are used. The display of one picture is called one frame, and one frame is formed by a plurality of sub-frames. Further, the time required for performing the display of one frame is called one frame period (Tf), and the periods corresponding to the displays in a plurality of the sub-frames constituting one frame period (Tf) are called sub-frame periods (Tsf).

In the liquid crystal display device according to the invention, by displaying a plurality of the sub-frames at high speed, the display of one image is performed. The picture signal for performing the display of a certain sub-frame and the picture signal for performing the display of the next sub-frame are identical with each other in the absolute value as measured from a reference potential but opposite to each other in polarity. In the liquid crystal display device according to the invention, these two sub-frames are always displayed as a pair.

In addition to the above-mentioned operation, to at least one of a plurality of the sub-frames displayed, a reset signal is applied. In the specification of the present application, the reset signal stands for a signal for performing the display of almost black on the screen.

In the liquid crystal display device according to the invention, which will be described below, one frame is formed of three sub-frames. Here, one frame period (Tf) is constituted of a first sub-frame period ($1^{st}$ Tsf), a second sub-frame period ($2^{nd}$ Tsf) and a third sub-frame period ($3^{rd}$ Tsf).

First, the display in the first frame period will be described. During the first sub-frame period ($1^{st}$ Tsf), a picture signal $D_1$ is fed to the corresponding TFTs, whereby the liquid crystal molecules are driven to perform the display of a picture. Next, during the second sub-frame period ($2^{nd}$ Tsf), a picture signal (inverted $D_1$) which is identical in absolute value with the picture signal $D_1$ but opposite in polarity to the picture signal $D_1$ is fed to the corresponding pixel TFT, whereby the display of an image is performed. Next, during the third sub-frame period, a reset signal R is fed to the corresponding pixel TFT, whereby the display of black is performed. This reset signal may be a signal which feeds a potential being the reference potential of the picture signal. Further, this reset signal may also be a signal which can perform the picture display of black even if the potential thereof is other than the reference potential.

By the above-mentioned operation, the display in the first frame period terminates, and the next frame period begins. The display in the next frame period is also performed in the same manner as the display in the first frame period. During the first sub-frame period ($1^{st}$ Tsf), a picture signal $D_2$ is fed to the corresponding pixel TFT, whereby the display of an image is performed. Next, during the second sub-frame period ($2^{nd}$ Tsf), a picture signal (inverted $D_2$) which is identical in absolute value with the picture signal $D_2$ but opposite in polarity to the picture signal $D_2$ is fed to the corresponding pixel TFT, whereby the display of an image is performed. Next, during the third sub-frame period, a reset signal R is fed to the corresponding pixel TFT, whereby the display of black is performed.

In the same way, the display in the successive frames is performed, whereby a picture is formed.

As mentioned above, in the liquid crystal display device according to the present invention, picture signals which are equal to each other in absolute value but opposite to each other in polarity are fed to the same pixel TFT, so that the charges which are opposite in polarity to the spontaneous polarization of the liquid crystal molecules accumulated when a picture signal is fed to the liquid crystal molecules are cancelled out. Further, in at least one sub-frame, an almost black picture display is performed. Thus, the "image persistence" on the display can be prevented.

The above-mentioned embodiment has been described with reference to the case where one frame is formed of three sub-frames, however, the present invention is not limited to such cases. The liquid crystal display device according to the invention may alternatively be constituted in such a manner that one frame is formed of m sub-frames, and the reset signal is fed to at least n sub-frames (m>n, m and n are natural numbers).

Figure 23:
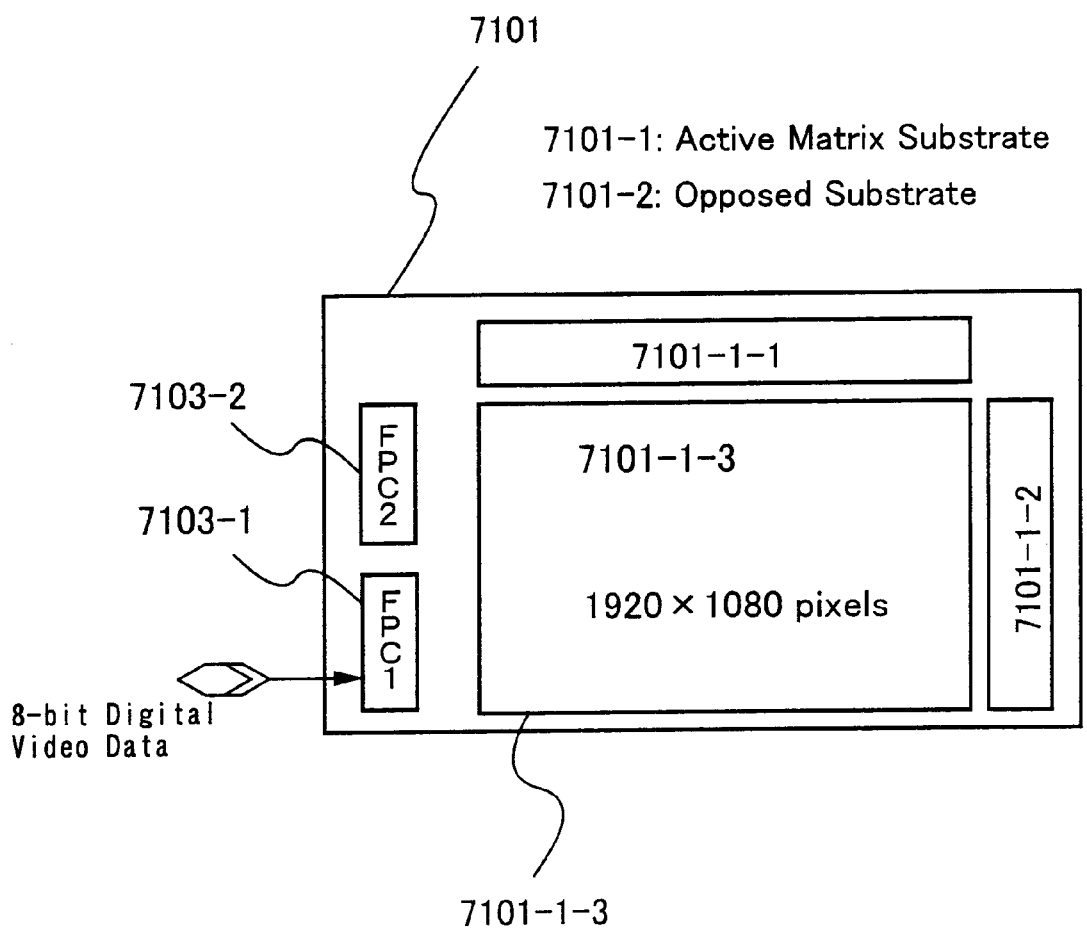
FIG. 23 is a diagram showing a constitutional outline of an embodiment of the liquid crystal display device according to the invention.

FIG. 23 will be referred to. FIG. 23 shows an outline of the constitution of the liquid crystal display device according to this embodiment. Numeral 7101 denotes a liquid crystal display device with digital drivers. The liquid crystal display device 7101 includes an active matrix substrate 7101-1 and an opposite substrate 7101-2 (not shown). The active matrix substrate 7101-1 includes a source driver 7101-1-1, a gate driver 7101-1-2 and a pixel portion 7101-1-3 in which a plurality of the pixel TFTs are matrix-wise disposed. The source driver 7101-1-1 and the gate driver 7101-1-2 drive a plurality of the pixel TFTs in the pixel portion. Further, the opposite substrate 7101-2 includes an opposite electrode 7101-2-1 (not shown). Numerals 7103-1 and 7103-2 denote FPC (Flexible Print Circuit) terminals; to these FPC terminals, various signals are inputted from the outside. To the liquid crystal display device according to this embodiment, 8-bit digital data are inputted from the outside.

Figure 24:
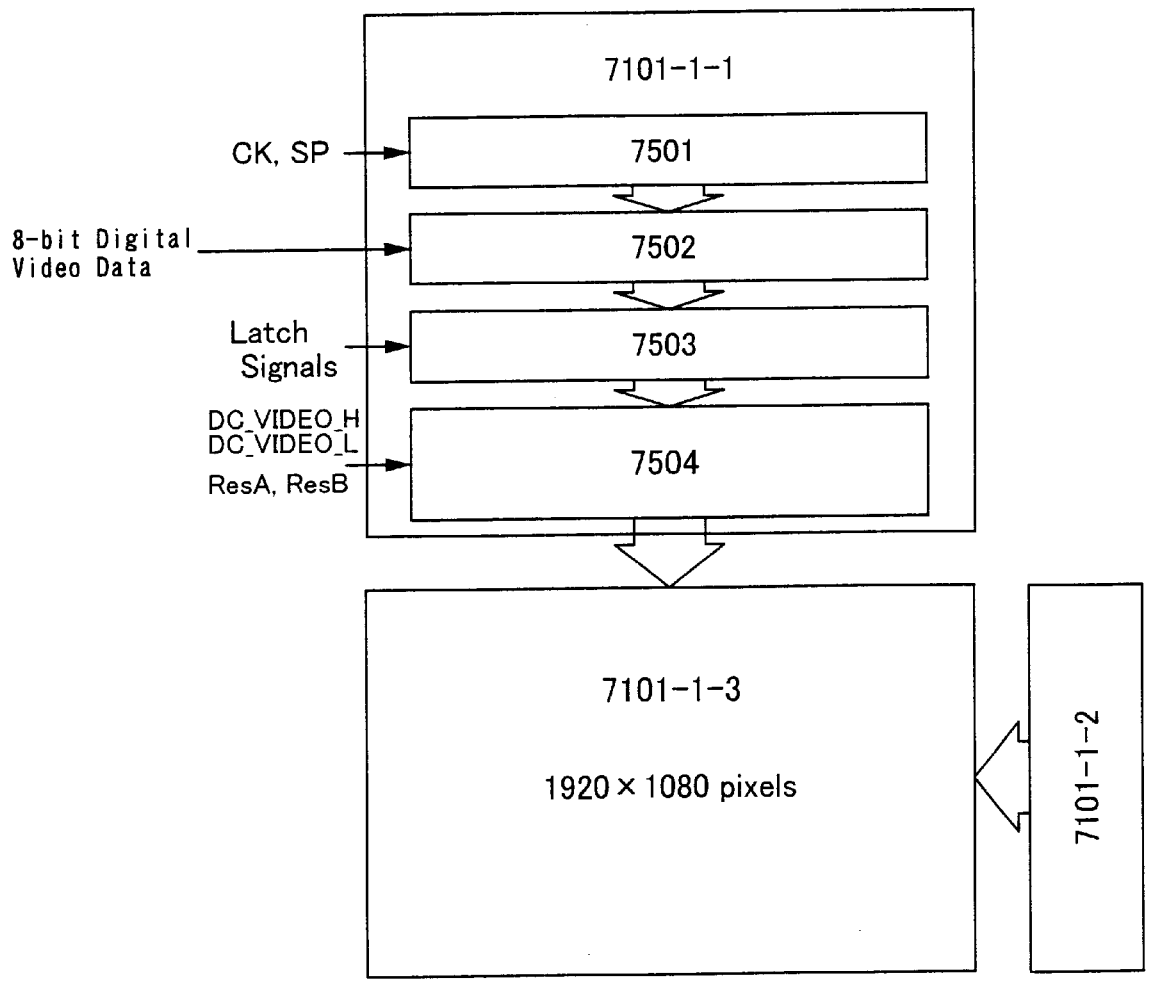
FIG. 24 is a diagram showing the circuit arrangement of the pixel portion, the source driver and the gate driver in an embodiment of the liquid crystal display device of the invention.

FIG. 24 will next be referred to. FIG. 24 is a diagram showing an outline of the constitution of the liquid crystal display device according to this embodiment, wherein the source driver is shown particularly in detail. Numeral 7101-1-1 denotes a source driver. Numeral 7101-1-2 denotes a gate driver. Numeral 7101-1-3 denotes a pixel portion.

The source driver 7101-1-1 includes a shift register circuit 7501, a latch circuit 1 (7502), a latch circuit 2 (7503) and a D/A conversion circuit 7504. The source driver 7101-1-1 further includes a buffer circuit and a level shifter circuit (neither of them is shown). Further, for convenience of description, in the D/A conversion circuit 7504, a level shifter circuit is included.

Numeral 7101-1-2 denotes the gate driver, which includes a shift register circuit, a buffer circuit, and a level shifter circuit (none of them is shown).

The pixel portion 7101-1-3 has 1920×1080 (the number of pixels in width×the number of pixels in length) pixels. In each of the pixels, a pixel TFT is disposed, and, to the source region of each pixel TFT, a source signal line is electrically connected, and, to the gate electrode, a gate signal line is electrically connected. Further, to the drain region of each pixel TFT, a pixel electrode is electrically connected. Each of the pixel TFTs controls the feed of a picture signal (gradation voltage) to the pixel electrode electrically connected to each pixel TFT. Each of the pixel electrodes is fed with the picture signal (gradation voltage), so that a voltage is applied to the liquid crystal sandwiched between each pixel electrode and the opposite electrode, whereby the liquid crystal is driven.

Here, the operation of and the signal flow in the active matrix liquid crystal display device according to this embodiment will be described.

First, the operation of the source driver will be described. To the shift register circuit 7501, a clock signal (CK) and a start pulse (SP) are inputted. The shift register circuit 7501 successively generates timing signals on the basis of the clock signal (CK) and the start pulse (SP) and successively feeds the timing signals to the circuit at the following stage through a buffer circuit and the like (not shown).

The timing signals from the shift register circuit 7501 are buffered by the buffer circuit and the like. To the source signal lines, which are fed with the timing signals, a large number of circuits or elements are connected; and thus, the load capacitance (parasitic capacitance) is large. In order to prevent the leading edge of the timing signal from being blunted due to the fact that this load capacitance is large, this buffer circuit is provided.

The timing signals thus buffered by the buffer circuit are fed to the latch circuit 1 (7502). The latch circuit 1 (7502), when the timing signals are inputted thereto, successively takes in and holds the 8-bit digital video data fed from the outside.

The length of time for thoroughly completing the writing of the digital video data into the latch circuits at all the stages of the latch circuit 1 (7502) is a sub-frame line period. That is, the time interval ranging from the point of time when the writing of the digital video data into the latch circuit at the leftmost-side stage in the latch circuit 1 (7502) is started to the point of time when the writing of the digital video data into the latch circuit at the rightmost-side stage is terminated, is a sub-frame line period. In actuality, the period comprising the above-mentioned sub-frame line period plus the horizontal retrace time is called the sub-frame line period in some cases.

After the termination of one sub-frame line period, a latch signal is fed to the latch circuit 2 (7503) in step with the operating timing of the shift register circuit 7501. At this moment, the digital video data which are written and held in the latch circuit 1 (7502) are transmitted to the latch circuit 2 (7503) all at once and written into the latch circuits at all the stages in the latch circuit 2 (7503) and held there.

Into the latch circuit 1 (7502) which has finished the transmission of the digital video data to the latch circuit 2 (7503), the writing of the digital video data fed from the outside is successively performed on the basis of the timing signals from the shift register circuit 7501.

During this second sub-frame line period, the digital video data which are written and held in the latch circuit 2 (7503) are successively fed to the D/A conversion circuit 7504.

As the D/A conversion circuit 7504 used in this embodiment, a D/A conversion circuit similar to the D/A conversion circuit of the foregoing Embodiment 1 shown in FIG. 7 may also be used.

Figure 25:
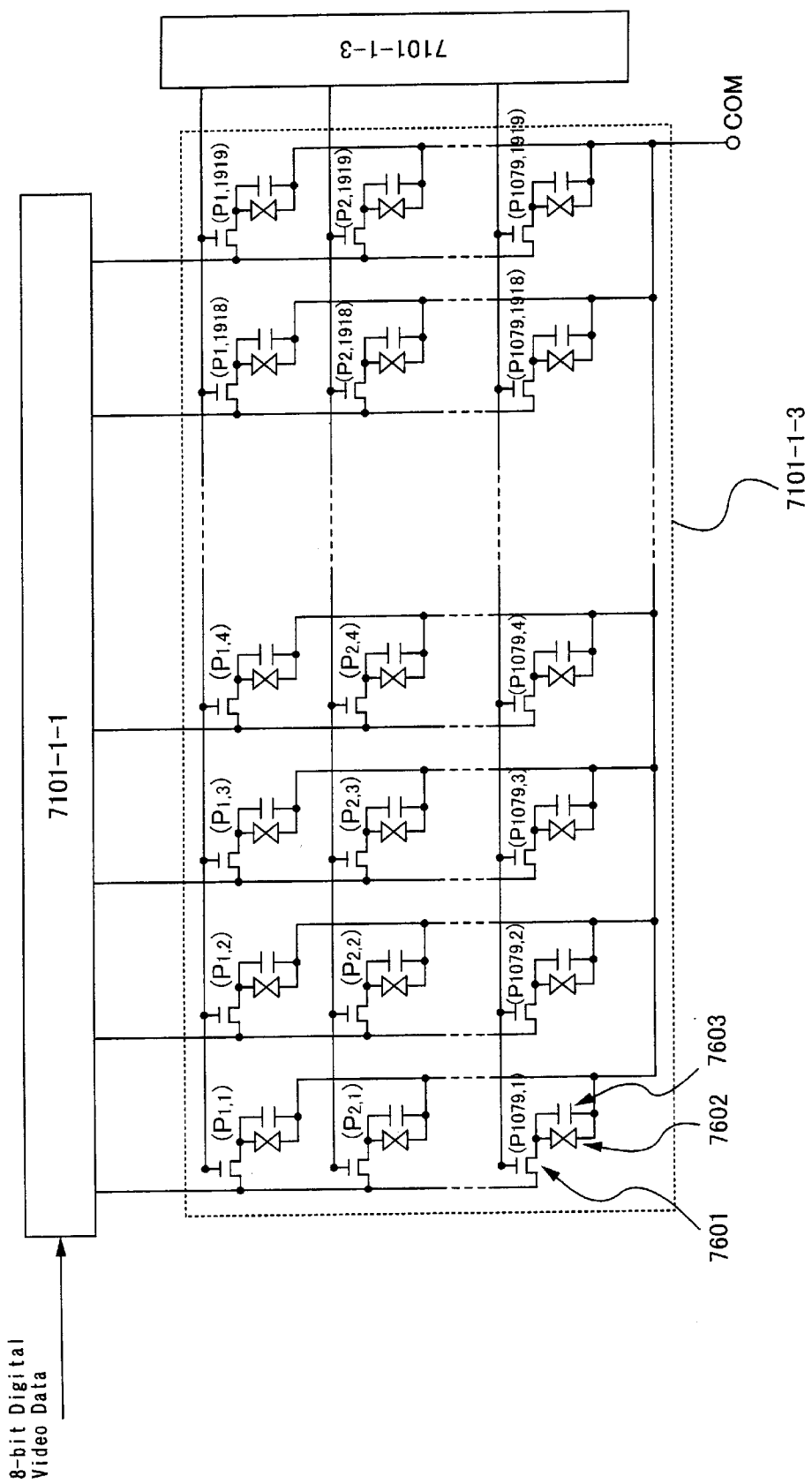
FIG. 25 is a diagram showing the circuit arrangement of the pixel portion, the source driver and the gate driver in an embodiment of the liquid crystal display device according to the invention.

Here, the circuit arrangement of the liquid crystal display device 7101 according to this embodiment and, more particularly, the constitution of the pixel portion 7101-1-3, will be described by referring to FIG. 25.

In this embodiment, the pixel portion 7101-1-3 has (1920×1080) pixels. To the respective pixels, symbols P1,1, P2,1, . . . , P1079,1919, etc. are put. Further, each of the respective pixels has a pixel TFT 7601 and a storage capacitor 7603. Between the active matrix substrate and the opposite substrate, a liquid crystal is sandwiched; as the liquid crystal 7602, the liquid crystal corresponding to each pixel is shown symbolically. COM denotes a common voltage terminal, which is connected to the opposite electrode and one end of each storage capacitor.

In the liquid crystal display device according to this embodiment, the so-called line-sequential driving is performed according to which the pixels (for example P1,1, P1,2, . . . , and P1,1919) corresponding to one line are driven simultaneously. In other words, a picture signal is written simultaneously into all the pixels corresponding to one line.

Figure 26:
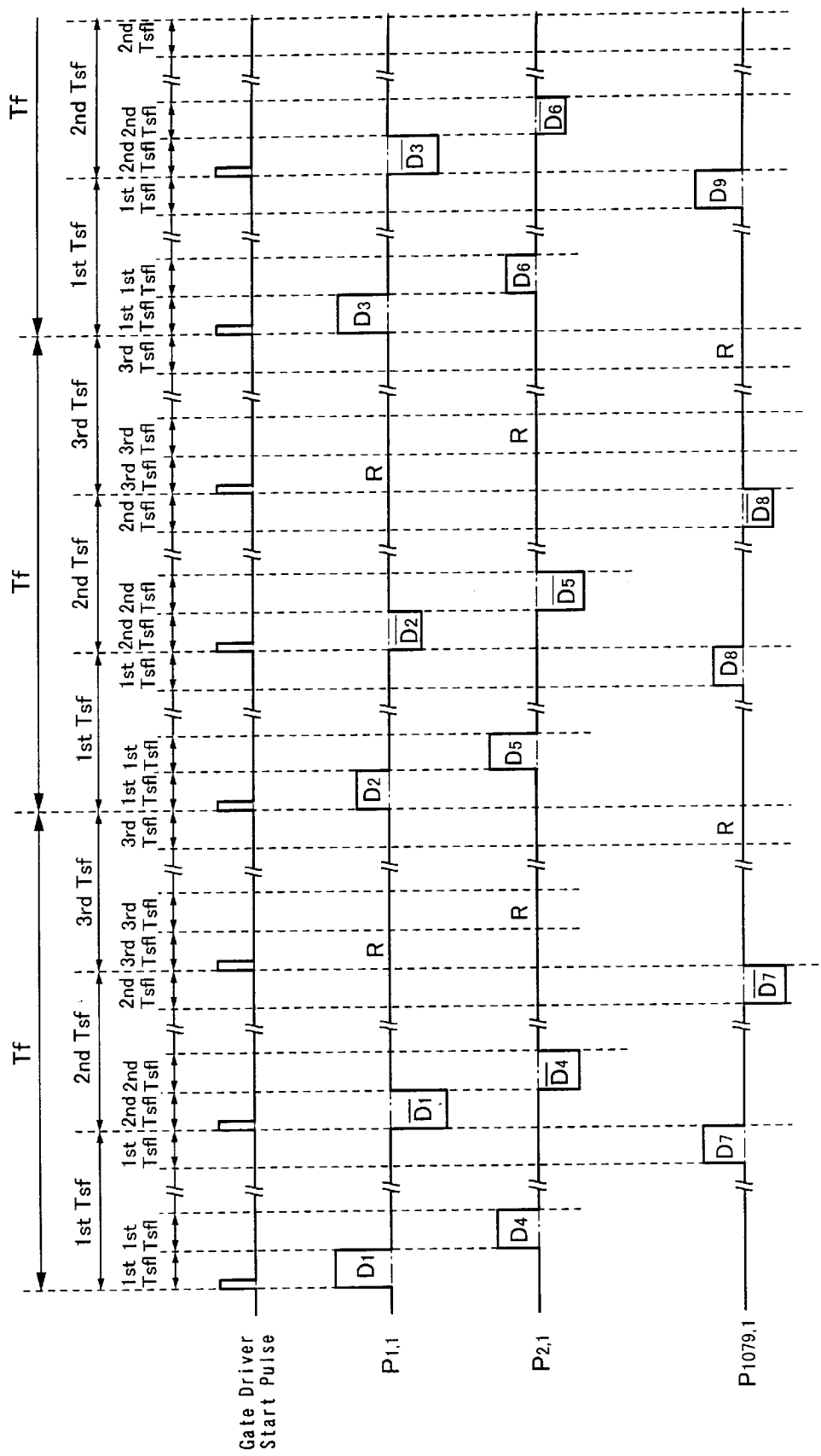
FIG. 26 is a driving timing chart of the liquid crystal display device according to the invention.

Here, the display method performed by the liquid crystal display device according to this embodiment will be described. FIG. 26 will be referred to. FIG. 26 shows a driving timing chart of the liquid crystal display device according to this embodiment. In the liquid crystal display device according to the present invention, which is described here, one frame is formed of three sub-frames. In this embodiment, one frame period (Tf) is constituted of a first sub-frame period ($1^{st}$ Tsf), a second sub-frame period ($2^{nd}$ Tsf) and a third sub-frame period ($3^{rd}$ Tsf).

In FIG. 26, the pixel P1,1, the pixel P2,1 and the pixel P1079,1 are shown by way of example.

First, the display in the first frame period will be described. During the first sub-frame period ($1^{st}$ Tsf), a start pulse is inputted to the gate driver; and, during the first sub-frame line period ($1^{st}$ Tsfl), digital video data are converted into a picture signal by the D/A conversion circuit and written into the pixels P1,1 to P1,1919. As shown in FIG. 26, for example a picture signal $D_1$ is written into the pixel P1,1.

Thereafter, during the next sub-frame line period, the digital video data are converted into a picture signal by the D/A conversion circuit and written into the pixels P2,1 to P2,1919. As shown in FIG. 26, for example, a picture signal $D_4$ is written into the pixel P2,1.

Thereafter, into the respective pixels, picture signals are written one after another; and a picture signal is written into the pixels P1079,1 to P1079,1919 corresponding to the last one line, with which the first sub-frame period terminates. As shown in FIG. 26, for example, a picture signal $D_7$ is written into the pixel P1079,1.

Next, the second sub-frame period ($2^{nd}$ Tsf) begins. When the second sub-frame period ($2^{nd}$ Tsf) begins, a start pulse is inputted to the gate driver, and, during the second sub-frame line period ($2^{nd}$ Tsfl), the digital video data are converted into a picture signal by the D/A conversion circuit and written into the pixels P1,1 to P1,1919. As shown in FIG. 26, for example, a picture signal (inverted $D_1$) is written into the pixel P1,1.

Thereafter, during the next sub-frame line period, the digital video data are converted into a picture signal by the D/A conversion circuit and written into the pixels P2,1 to P2,1919. As shown in FIG. 26, for example, a picture signal (inverted $D_4$) is written into-the pixel P2,1.

Thereafter, picture signals are written into the respective pixels one after another; and, into the pixels P1079,1 to P1079,1919 corresponding to the last one line, a picture signal is written, with which the first sub-frame period terminates. As shown in FIG. 26, for example, a picture signal (inverted $D_7$) is written into the pixel P1079,1.

Next, the third sub-frame ($3^{rd}$ Tsf) begins. When the third sub-frame period ($3^{rd}$ Tsf) begins, a start pulse is inputted to the gate driver, and the reset signal R resulting from converting the digital video data by the D/A conversion circuit is written into the pixels P1,1 to P1,1919, whereby a black picture display is performed. Thereafter, during the next sub-frame line period, the reset signal R resulting from converting the digital video data by the D/A conversion circuit is written into the pixels P2,1 to P2,1919, whereby a black picture display is performed. Thereafter, the reset signal R is written into the respective pixels one after another; and, into the pixels P1079,1 to P1079,1919, the reset signal R is written, whereby a black picture display is performed. Thus, the third sub-frame period terminates.

With the operation described above, the picture display in one frame terminates.

In the same way, the display in the succeeding frames is performed, whereby images are formed.

As mentioned above, in the liquid crystal display device according to this embodiment, picture signals which are identical with each other in absolute value but opposite to each other in polarity are fed to the same pixel TFT through the successive sub-frames, so that the charges which are opposite in polarity to the spontaneous polarization of the liquid crystal molecules accumulated when picture signals are fed to the liquid crystal molecules are canceled out. Further, in at least one sub-frame, the display of black is performed. Thus, the "image persistence" of the display can be prevented.

Embodiment 5

This embodiment relates to a liquid crystal display device according to the present invention but based on a display method different from that of the above-mentioned Embodiment 4. The constitution of the liquid crystal display device according to this embodiment is similar to that of Embodiment 4, so that Embodiment 4 can be referred to.

Figure 27:
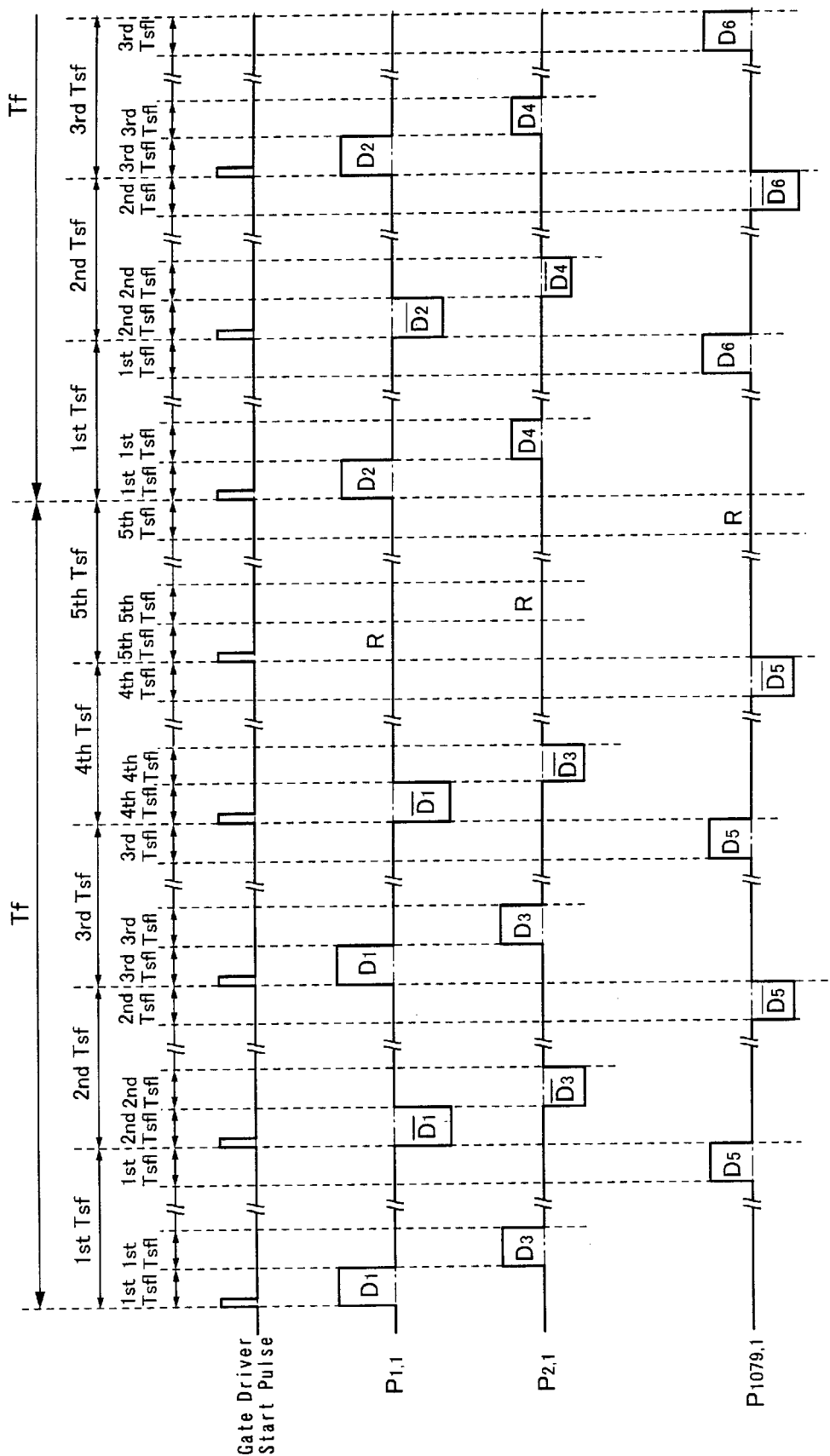
FIG. 27 is a driving timing chart of the liquid crystal display device according to the invention.

Here, the display method of the liquid crystal display device according to this embodiment will be described. FIG. 27 will be referred to. FIG. 27 shows a driving timing chart of the liquid crystal display device according to this embodiment. In the liquid crystal display device of the present invention, which is described here, one frame is formed of five sub-frames. More specifically, one frame period (Tf) is constituted of a first sub-frame period ($1^{st}$ Tsf), a second sub-frame period ($2^{nd}$ Tsf), a third sub-frame period ($3^{rd}$ Tsf), a fourth sub-frame period ($4^{th}$ Tsf) and a fifth sub-frame period ($5^{th}$ Tsf).

In FIG. 27, the pixel P1,1, the pixel P2,1 and the pixel P1079,1 are shown by way of example.

First, the display in the first frame period will be described. During the first sub-frame period ($1^{st}$ Tsf), a start pulse is inputted to the gate driver; and, during the first sub-frame line period ($1^{st}$ Tsfl), the digital video data are converted into a picture signal by the D/A conversion circuit and written into the pixels P1,1 to P1,1919. For example, into the pixel P1,1, a picture signal $D_1$ is written as shown in FIG. 27.

Thereafter, during the next sub-frame line period, the digital video data are converted into a picture signal by the D/A conversion circuit and written into the pixels P2,1 to P2,1919. Into the pixel P2,1, a picture signal $D_3$ is written as shown in FIG. 27.

Thereafter, picture signals are successively written into the respective pixels; and, into the pixels P1079,1 to P1079,1919 corresponding to the last one line, a picture signal is written, with which the first sub-frame period terminates. In this case, for example, into the pixel P1079,1, a picture signal $D_5$ is written as shown in FIG. 27.

Next, the second sub-frame period ($2^{nd}$ Tsf) begins. When the second sub-frame period ($2^{nd}$ Tsf) begins, a start pulse is inputted to the gate driver; and, during the second sub-frame line period ($2^{nd}$ Tsfl), the digital video data are converted into a picture signal by the D/A conversion circuit and written into the pixels P1,1 to P1,1919. For example, into the pixel P1,1, a picture signal (inverted $D_1$) is written as shown in FIG. 27.

Thereafter, during the next sub-frame line period, the digital video data are converted into a picture signal by the D/A conversion circuit and written into the pixels P2,1 to P2,1919. For example, into the pixel P2,1, a picture signal (inverted $D_3$) is written as shown in FIG. 27.

Thereafter, picture signals are successively written into the respective pixels; and a picture signal is written into the pixels P1079,1 to P1079,1919 corresponding to the last one line, with which the second sub-frame period terminates. For example, into the pixel P1079,1, a picture signal (inverted $D_5$) is written as shown in FIG. 27.

Next, the third sub-frame period ($3^{rd}$ Tsf) begins. When the third sub-frame period ($3^{rd}$ Tsf) begins, a start pulse is inputted to the gate driver; and, during the third sub-frame line period ($3^{rd}$ Tsfl), the digital video data are converted into a picture signal by the D/A conversion circuit and written into the pixels P1,1 to P1,1919. For example, into the pixel P1,1, the same picture signal $D_1$ as the picture signal written during the first sub-frame line period ($1^{st}$ Tsfl) is written as shown in FIG. 27.

Thereafter, during the next sub-frame line period, the digital video data are converted into a picture signal by the D/A conversion circuit and written into the pixels P2,1 to P2,1919. For example, into the pixel P2,1, the same picture signal $D_3$ as the picture signal written during the first sub-frame line period ($1^{st}$ Tsfl) is written as shown in FIG. 27.

Thereafter, picture signals are successively written into the respective pixels; and, into the pixels P1079,1 to P1079,1919 corresponding to the last one line, the picture signal is written, with which the third sub-frame period terminates. For example, into the pixel P1079,1, the same picture signal $D_5$ as the picture signal that was written during the first sub-frame line period ($1^{st}$ Tsfl), is written as shown in FIG. 27.

Next, the fourth sub-frame period ($4^{th}$ Tsf) begins. When the fourth sub-frame period ($4^{th}$ Tsf) begins, a start pulse is inputted to the gate driver; and, during the fourth sub-frame line period ($4^{th}$ Tsfl), the digital video data are converted into a picture signal by the D/A conversion circuit and written into the pixels P1,1 to P1,1919. For example, into the pixel P1,1, the same picture signal (inverted $D_1$) as the picture signal written during the second sub-frame line period ($2^{nd}$ Tsfl) is written.

Thereafter, during the next sub-frame line period, the digital video data are converted into a picture signal by the D/A conversion circuit and written into the pixels P2,1 to P2,1919. For example, into the pixel P2,1, the same picture signal (inverted $D_3$) as the picture signal that was written during the second sub-frame period ($2^{nd}$ Tsfl) is written as shown in FIG. 27.

Thereafter, picture signals are successively written into the respective pixels; and, into the pixels P1079,1 to P1079,1919 corresponding to the last one line, a picture signal is written, with which the fourth sub-frame period terminates. For example, into the pixel P1079,1, the same picture signal (inverted $D_5$) that was written during the second sub-frame line period ($2^{nd}$ Tsfl) is written as shown in FIG. 27.

Next, the fifth sub-frame period ($5^{th}$ Tsf) begins. When the fifth sub-frame period ($5^{th}$ Tsf) begins, a start pulse is inputted to the gate driver; and, during the fifth sub-frame line period ($5^{th}$ Tsfl), the reset signal R resulting from converting the digital video data by the D/A conversion circuit is inputted into the pixels P1,1 to P1,1919, whereby the display of black is performed. Thereafter, during the next sub-frame line period, the reset signal R resulting from converting the digital video data by the D/A conversion circuit is written into the pixels P2,1 to P2,1919, whereby the display of black is performed. Thereafter, the reset signal R is successively written into the respective pixels; and, into the pixels P1079,1 to P1079,1919 corresponding to the last one line is written, the reset signal is written, whereby the display of black is performed. In this way, the fifth sub-frame period terminates.

The first to fifth sub-frame periods thus terminate; that is, one frame period terminates.

In the same way, the display of the succeeding frames is performed, whereby a picture is formed.

As stated above, in the liquid crystal display device according to the present invention, the display of one frame is formed by performing the displays of five sub-frames at high speed. Thus, the "image persistence" of the display can be prevented, and the flicker of the picture can be reduced.

Embodiment 6

Figure 28:
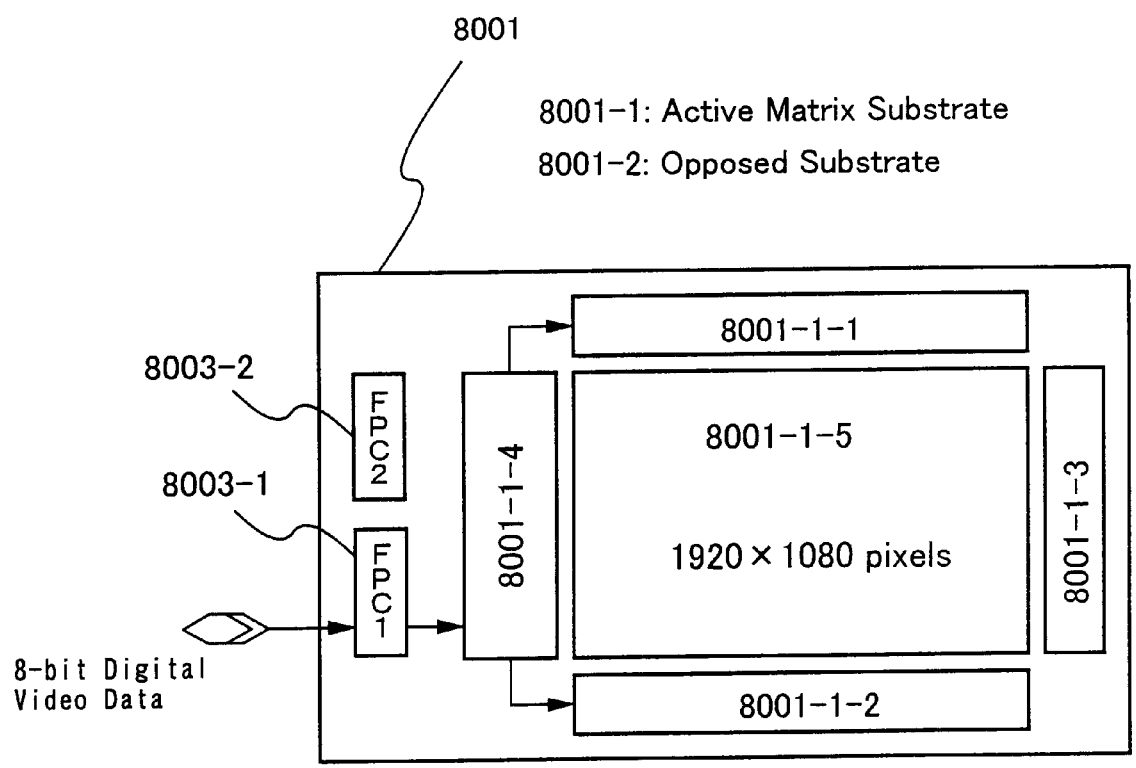
FIG. 28 is a diagram showing a constitutional outline of an embodiment of the liquid crystal display device according to the invention.

FIG. 28 will be referred to. FIG. 28 is a diagram showing an outline of the constitution of the liquid crystal display device according to this embodiment. Numeral 8001 denotes a liquid crystal display device with digital drivers. The liquid crystal display device 8001 includes an active matrix substrate 8001-1 and an opposite substrate 8001-2 (not shown). The active matrix substrate 8001-1 includes a source driver 8001-1-1, a source driver 8001-1-2, a gate driver 8001-1-3, a digital video data division circuit 8001-1-4 and a pixel portion 8001-1-5 in which a plurality of pixel TFTs are matrix-wise disposed. The source driver 8001-1-1, the source driver 8001-1-2 and the gate driver 8001-1-3 drive a plurality of the pixel TFTs in the pixel portion. Further, the opposite substrate 8001-2 includes an opposite electrode 8001-2-1 (not shown). Numerals 8003-1 and 8003-2 denote FPC terminal; to these FPC terminals, various signals are inputted from the outside.

The source driver 8001-1-1 drives the pixels connected to the odd-numbered source signal lines in the pixel portion, while the source driver 8001-1-2 drives the pixels connected to the even-numbered source signal lines.

Numeral 8001-1-4 denotes a digital video data division circuit (which is in some cases called SPC: Serial-to-Parallel Conversion Circuit). The digital video data division circuit 8001-1-4 is a circuit for lowering the frequency of the digital video data inputted from the outside to 1/x (x stands for a natural number of 2 or greater). By dividing the digital video data inputted from the outside, the digital video data division circuit 8001-1-4 could drop the frequency of the signal necessary for the operation of the driving circuits to 1/x. In the liquid crystal display device according to this embodiment, the digital video data division circuit 8001-1-4 drops the 8-bit digital video data of 80 MHz inputted from the outside to 10 MHz.

The constitution of the remaining portion of this liquid crystal display device according to this embodiment is identical with that of Embodiment 4.

Embodiment 7

Here, the method of fabricating on one and the same substrate the TFTs of the driving circuits (the source driver, the gate driver, the D/A conversion circuit and the like) provided in the periphery of the pixel portion will be described in detail in accordance with the fabricating steps. However, in order to simplify the description, CMOS circuits that are the basic circuits of the shift register circuit, the buffer circuit, the D/A conversion circuit and the like and n-channel type TFTs will be shown.

Referring to FIG. 11A, a low-alkaline glass substrate or a quartz substrate can be used as a substrate 6001. In this embodiment, a low-alkaline glass substrate was used. In this case, the low-alkaline glass substrate may be previously heat-treated at a temperature lower by about 10 to 20° C. than the strain point glass. On the surface of this substrate 6001 on which TFTs are to be formed, a ground film 6002 such as a silicon oxide film, a silicon nitride film or a silicon oxinitride film is formed in order to prevent the diffusion of impurities from the substrate 6001. For example, a silicon oxinitride film which is fabricated from $SiH_4$, $NH_3$, $N_2O$ by, e.g., the plasma CVD method and a silicon oxinitride film which is similarly fabricated from $SiH_4$ and $N_2O$ are formed into a stacked film layer, wherein the thickness of both films is 100 nm.

Next, a semiconductor film 6003a that has an amorphous structure and a thickness of 20 to 50 nm (preferably, 30 to 80 nm) is formed by a known method such as the plasma CVD method or the sputtering method. In this embodiment, an amorphous silicon film was formed to a thickness of 55 nm by the plasma CVD method. As semiconductor films which have an amorphous structure, there are an amorphous semiconductor film and a microcrystalline semiconductor film; and a compound semiconductor film with an amorphous structure such as an amorphous silicon germanium film may also be applied. Further, the ground film 6002 and the amorphous silicon film 6003a can be formed by the same deposition method, so that the two films can be formed in succession. By not exposing the ground film once to the atmospheric air after the formation of the ground film, the surface of the ground film can be prevented from being contaminated, as a result of which the dispersion in characteristics of the fabricated TFTs and the variation in the threshold voltage thereof can be reduced. (FIG. 11A)

Then, by a known crystallization technique, a crystalline silicon film 6003b is formed from the amorphous silicon film 6003a. For example, the laser crystallization method or the thermal crystallization method (solid phase growth method) can be applied, however, here, in accordance with the technique disclosed in Japanese Patent Laid-Open No. 130652/1995, the crystalline silicon film 6003b was formed by the crystallization method using a catalytic element. It is preferred that, prior to the crystallization step, heat treatment is carried out at 400 to 500° C. for about one hour though it depends on the amount of hydrogen contained, so that, after the amount of hydrogen contained is reduced to 5 atomic % or less, the crystallization is carried out. The atoms are subjected to re-configuration to become dense when an amorphous silicon film is crystallized; and therefore, the thickness of the crystalline silicon film fabricated is reduced by about 1 to 15% than the initial thickness of the amorphous silicon film (55 nm in this embodiment). (FIG. 11B)

Then, the crystalline silicon film 6003b is divided into island-shaped portions, whereby island-shaped semiconductor layers 6004 to 6007 are formed. Thereafter, by the plasma CVD method or the sputtering method, a mask layer 6008 of a silicon oxide film is formed to a thickness of 50 to 100 nm. (FIG. 11C)

Then, a resist mask 6009 is provided, and, into the whole surfaces of the island-shaped semiconductor layer 6005 to 6007 forming the n-channel type TFTs, boron (B) was added as an impurity element for imparting the p conductivity type, at a concentration of about $1\times10^{16}$ to $5\times10^{17}$ atoms/cm$^3$, for the purpose of controlling the threshold voltage. The addition of boron (B) may be effected either by the ion doping method or by adding simultaneously when the amorphous silicon film is formed. The addition of boron (B) here was not always necessary, however, the formation of semiconductor layers 6010 to 6012 into which boron was added was desirable for maintaining the threshold voltage of the n-channel type TFTs within a predetermined range. (FIG. 11D)

In order to form the LDD regions of the n-channel type TFTs in the driving circuit, an impurity element for imparting the n conductivity type is selectively added to the island-shaped semiconductor layers 6010, 6011. For this purpose, resist masks 6013 to 6016 were previously formed. As the impurity element for imparting the n conductivity type, phosphorus (P) or arsenic (As) may be used; here, in order to add phosphorus (P), the ion doping method using phosphine ($PH_3$) was applied. The concentration of phosphorus (P) in the impurity regions 6017, 6018 thus formed may be set within the range of from $2\times10^{16}$ to $5\times10^{19}$ atoms/$cm^3$. In this specification, the concentration of the impurity element contained in the thus formed impurity regions 6017 to 6019 for imparting the n conductivity type to them, is represented by $n^-$. Further, the impurity region 6019 is a semiconductor layer for forming the storage capacitor of the pixel matrix circuit; into this region, phosphorus (P) was also added at the same concentration. (FIG. 12A)

Next, the mask layer 6008 is removed by hydrofluoric acid or the like, and the step of activating the impurity elements added at the steps shown in FIG. 12D and FIG. 12A is carried out. The activation can be carried out by performing heat treatment in a nitrogen atmosphere at 500 to 600° C. for 1 to 4 hours or by using the laser activation method. Further, both methods may be jointly performed. In this embodiment, the laser activation method was employed, and a KrF excimer laser beam (with a wavelength of 248 nm) was used to form a linear beam; and scan was carried out under the condition that the oscillation frequency was 5 to 50 Hz, the energy density was 100 to 500 mJ/$cm^2$, and the overlap ratio of the linear beam was 80 to 98%, whereby the whole substrate surface on which the island-shaped semiconductor layers were formed. Any item of the laser irradiation condition is subjected to no limitation, so that the operator may suitably select the condition.

Then, a gate insulator film 6020 is formed of an insulator film containing silicon to a thickness of 10 to 50 nm, by the plasma CVD method or the sputtering method. For example, a silicon oxinitride film is formed to a thickness of 20 nm. As the gate insulator film, another insulator film containing silicon may be used as a single layer or as a stacked film structure. (FIG. 12B)

Next, in order to forming a gage electrode, a first conductive layer is formed by deposition. This first conductive layer may be comprised of a single layer but may also be comprised of a stacked film layer consisting of two or three layers. In this embodiment, a conductive layer (A) 6021 comprising a conductive metal nitride film and a conductive layer (B) 6022 comprising a metal film are stacked. The conductive layer (B) 6022 may be formed of an element selected from among tantalum (Ta), titanium (Ti), molybdenum (Mo) and tungsten (W) or an alloy comprised mainly of the above-mentioned element, or an alloy film (typically, an Mo-W alloy film or an Mo-Ta alloy film) comprised of a combination of the above-mentioned elements, while the conductive layer (A) 6021 is formed of a tantalum nitride (TaN) film, a tungsten nitride (WN) film, a titanium nitride (TiN) film, or a molybdenum nitride (MoN) film. Further, as the substitute materials of the conductive film (A) 6021, tungsten silicide, titanium silicide, and molybdenum silicide may also be applied. The conductive layer (B) should desirably have its impurity concentration reduced in order to decrease the resistance thereof; in particular, as for the oxygen concentration, in the case that the oxygen concentration was set to 30 ppm or less, a good result was obtained. For example, tungsten (W) could result in realizing a resistivity of 20 $\mu\Omega$cm or less by rendering the oxygen concentration thereof to 300 ppm or less.

The conductive layer (A) 6021 may be set to 10 to 50 nm (preferably, 20 to 30 nm), and the conductive layer (B) 6022 may be set to 6100 to 400 nm (preferably, 250 to 350 nm). In this embodiment, as the conductive layer (A) 6021, a tantalum nitride film with a thickness of 30 nm was used, while, as the conductive layer (B) 6022, a Ta film with a thickness of 350 nm was used, both films being formed by the sputtering method. In the case that film-forming deposition is carried out by this sputtering method, if a suitable amount of Xe or Kr is added into Ar, which is the sputtering gas, the internal strain of the film formed is alleviated, whereby the film can be prevented from peeling off. Though not shown, it is effective to form a silicon film, into which phosphorus (P) is doped, to a thickness of about 2 to 20 nm underneath the conductive layer (A) 6021. By so doing, the adhesibility of the conductive film formed thereon can be enhanced, and at the same time, oxidation can be prevented; and in addition, the alkali metal element slightly contained in the conductive film (A) or the conductive film (B) can be prevented from diffusing into the gate insulator film 6020. (FIG. 12C)

Next, resist masks 6023 to 6027 are formed, and the conductive layer (A) 6021 and the conductive layer (B) 6022 are etched together to form gate electrodes 6028 to 6031 and a capacitor wiring 6032. The gate electrodes 6028 to 6031 and the capacitor wiring 6032 are formed in such a manner that the layers 6028a to 6032a comprised of the conductive layer (A) and the layers 6028b 5o 6032b comprised of the conductive layer (B) are formed as one body respectively. In this case, the gate electrodes 6029, 6030 formed in the driving circuit are formed so as to overlap the portions of the impurity regions 6017, 6018 through the gate insulator film 6020. (FIG. 12D)

Then, in order to form the source region and the drain region of the p-channel type TFT in the driving circuit, the step of adding an impurity element for imparting the p conductivity type is carried out. Here, by using the gate electrode 6028 as a mask, impurity regions are formed in a self-alignment manner. In this case, the region in which the n-channel type TFT will be formed is previously coated with a resist mask 6033. Thus, impurity regions 6034 were formed by the ion doping method using diborane ($B_2H_6$). The concentration of boron (B) in this region is brought to $3\times10^{20}$ to $3\times10^{21}$ atoms/$cm^3$. In this specification, the concentration of the impurity element imparting the p conductivity type which impurity element is contained in the impurity regions 6034 is represented by $p^+$. (FIG. 13A)

Next, in the n-channel type TFTs, impurity regions that functioned as source regions or drain regions were formed. Resist masks 6035 to 6037 were formed, an impurity element for imparting the n conductivity type was added to form impurity regions 6038 to 6042. This was carried out by the ion doping method using phosphine ($PH_3$), and the phosphorus (P) concentration in these regions was set to $1\times10^{20}$ to $1\times10^{21}$ atoms/$cm^3$. In this specification, the concentration of the impurity element imparting the n conductivity type which impurity element is contained in the impurity regions 6038 to 6042 formed here is represented by n⁺. (FIG. 13B)

In the impurity regions 6038 to 6042, the phosphorus (P) or boron (B) which was added at the preceding step is contained, however, as compared with this impurity element concentration, phosphorus is added here at a sufficiently high concentration, so that the influence by the phosphorus (P) or boron (B) added at the preceding step need not be taken into consideration. Further, the concentration of the phosphorus (P) that is added into the impurity regions 6038 is ½ to ⅓ of the concentration of the boron (B) added at the step shown in FIG. 13A; and thus, the p-type conductivity was secured, and no influence was exerted on the characteristics of the TFTs.

Then, the step of adding an impurity for imparting the n conductivity type for formation of the LDD regions of the n-channel type TFT in the pixel matrix circuit was carried out. Here, by using the gate electrode 6031 as a mask, the impurity element for imparting the n conductivity type was added in a self-alignment manner. The concentration of phosphorus (P) added was $1\times10^{16}$ to $5\times10^{18}$ atoms/cm³; by thus adding phosphorus at a concentration lower than the concentrations of the impurity elements added at the steps shown in FIG. 12A, FIG. 13A and FIG. 13B, substantially only impurity regions 6043, 6044 were formed. In this specification, the concentration of the impurity element for imparting the n conductivity type which impurity element is contained in these impurity regions 6043, 6044 is represented by n⁻⁻. (FIG. 13C)

Thereafter, in order to activate the impurity elements, which were added at their respective concentrations for imparting n conductivity type or the p conductivity type, a heat treatment step was carried out. This step can be carried out by the furnace annealing method, the laser annealing method or the rapid thermal annealing method (RTA method). Here, the activation step was performed by the furnace anneal method. Heat treatment is carried out in a nitrogen atmosphere with an oxygen concentration of 1 ppm or less, preferably 0.1 ppm or less, at 400 to 800° C., generally at 500 to 600° C.; in this embodiment, the heat treatment was carried out at 550° C. for four hours. Further, in the case a substrate such as a quartz substrate which has heat resistance is used as the substrate 6001, the heat treatment may be carried out at 800° C. for one hour; in this case, the activation of the impurity element and the junctions between the impurity regions into which the impurity element was added and the channel-forming region could be well formed.

By this heat treatment, on the metal films 6028b to 6032b, which form the gate electrodes 6028 to 6031 and the capacitor wiring 6032, conductive layers (C) 6028c to 6032c are formed with a thickness of 5 to 80 nm as measured from the surface. For example, in the case the conductive layers (B) 6028b to 6032b are made of tungsten (W), tungsten nitride (WN) is formed; in the case of tantalum (Ta), tantalum nitride (TaN) can be formed. Further, the conductive layers (C) 6028c to 6032c can be similarly formed by exposing the gate electrodes 6028 to 6031 to a plasma atmosphere containing nitrogen which plasma atmosphere uses nitrogen or ammonia. Further, heat treatment was carried out in an atmosphere containing 3 to 100% of hydrogen at 300 to 450° C. for 1 to 12 hours, thus performing the step of hydrogenating the island-shaped semiconductor layers. This step is a step for terminating the dangling bonds of the semiconductor layers by the thermally excited hydrogen. As another means for the hydrogenation, plasma hydrogenation (using the hydrogen excited by plasma) may be performed.

In the case the island-shaped semiconductor layers were fabricated from an amorphous silicon film by the crystallization method using a catalytic element, a slight amount of the catalytic element remained in the island-shaped semiconductor layers. Of course, it is possible to complete the TFT even in such a state, however, it was more preferable to remove the residual catalytic element at least from the channel-forming region. As one of the means for removing this catalytic element, there was the means utilizing the gettering function of phosphorus (P). The concentration of phosphorus (P) necessary to perform gettering is at the same level as that of the impurity region (n⁺) which was formed at the step shown in FIG. 13B; by the heat treatment at the activation step carried out here, the catalytic element could be gettered from the channel-forming region of the n-channel type and the p-channel type TFTs. (FIG. 13D)

After the activation and hydrogenation steps are over, a gate wiring and a second conductive film are formed. This second conductive film is preferably formed of a conductive layer (D) comprised mainly of aluminum (Al) or copper (Cu) that is a low resistance material, and a conductive layer (E) comprised of titanium (Ti), tantalum (Ta), tungsten (W), or molybdenum (Mo). In this embodiment, the second conductive film was formed by using, as the conductive layer (D) 6045, an aluminum (Al) film containing 0.1 to 2 wt % of titanium (Ti) and by using a titanium (Ti) film as the conductive layer (E) 6046. The conductive layer (D) 6045 may be formed to a thickness of 100 to 400 nm (preferably, 250 to 350 nm), while the conductive layer (E) 6046 may be formed to a thickness of 50 to 100 nm (preferably, 100 to 150 nm). (FIG. 14A)

Then, in order to form gate wirings connected to the gate electrodes, the conductive layer (E) 6046 and the conductive layer (D) 6045 were etched, whereby gate wirings 6047, 6048 and a capacitor wiring 6049 were formed. The etching treatment was carried out in such a manner that, at first, by the dry etching method using a mixture gas consisting of $SiCl_4$, $Cl_2$ and $BCl_3$, the portions extending from the surface of the conductive layer (E) to an intermediate portion of the conductive layer (D) were removed, and, thereafter, the conductive layer (D) was removed by the wet etching using a phosphoric acid series etching solution, whereby the gate wirings could be formed, maintaining a selective workability with respect to the ground layer.

An interlayer dielectric film 6050 is formed of an silicon oxide film or a silicon oxinitride film with a thickness of 500 to 1500 nm, and then, contact holes reaching the source regions or the drain regions, which are formed in the respective island-shaped semiconductor layers, are formed; and source wirings 6051 to 6054 and drain wirings 6055 to 6058 are formed. Though not shown, in this embodiment, these electrodes were rendered into a stacked film of a three-layer structure which was constituted by continuously forming a Ti film with a thickness of 100 nm, an aluminum film containing Ti and having a thickness of 300 nm, and a Ti film with a thickness of 50 nm by the sputtering method.

Next, as a passivation film 6059, a silicon oxinitride film, a silicon oxide film or a silicon oxinitride film is formed to a thickness of 50 to 500 nm (typically, 100 to 300 nm). In the case that a hydrogenating treatment was carried out in this state, a desirable result was obtained in respect of the enhancement in characteristics of the TFTs. For example, it is preferable to carry out heat treatment in an atmosphere containing 3 to 100% of hydrogen at 300 to 450° C. for 1 to 12 hours; or, in the case that the plasma hydrogenation method was employed, a similar effect was obtained. Here, openings may be formed in the passivation film 6059 at the positions at which contact holes for connecting the pixel electrodes and drain wirings to each other will be formed later. (FIG. 14C)

Figure 15:
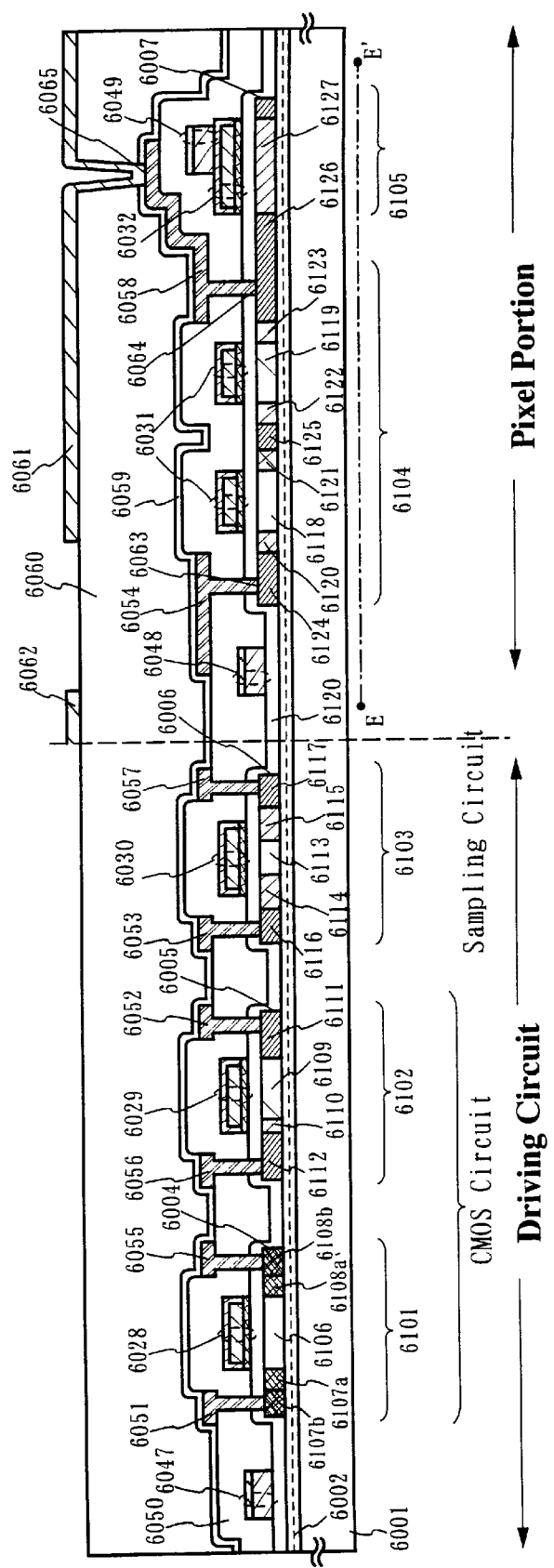
FIG. 15 is a schematic diagram showing some exemplary fabrication steps for fabricating the liquid crystal display device according to the invention.

Thereafter, a second interlayer dielectric film 6060 comprised of an organic resin is formed to a thickness of 1.0 to 1.5 μm. As the organic resin, polyimide, acrylic, polyamide, polyimideamide, or BCB (benzocyclobutene) can be used. Here, polyimide of the type that, after applied to the substrate, thermally polymerizes was used; it was fired at 300° C., whereby the second interlayer dielectric film was formed. Then, a contact hole reaching the drain wiring 6058 was formed in the second interlayer dielectric film 6060, and pixel electrodes 6061, 6062 were formed. The pixel electrodes can be formed by using a transparent conductive film in the case a transmission type liquid crystal display device is to be obtained, while, in the case a reflection type liquid crystal display device is to be fabricated, the pixel electrodes can be formed by a metal film. In this embodiment, a transmission type liquid crystal display device is to be fabricated, so that an indium tin oxide (ITO) film was formed to a thickness of 100 nm by the sputtering method. (FIG. 15)

In this way, on one and the same substrate, a substrate having the TFTs of the driving circuit and the pixel TFTs of the pixel portion could be completed. In the driving circuit, there were formed a p-channel type TFT 6101, a first n-channel type TFT 6102 and a second n-channel type TFT 6103, while, in the pixel portion, there were formed a pixel TFT 6104 and a storage capacitor 6105. In this specification, such a substrate is called active matrix substrate for convenience.

The p-channel type TFT 6101 in the driving circuit has a channel-forming region 6106, source regions 6107a, 6107b and drain regions 6108a, 6108b in the island-shaped semiconductor layer 6004. The first n-channel type TFT 6102 has a channel-forming region 6109, an LDD region 6110 overlapping the gate electrode 6029(such an LDD region will hereinafter be referred to as Lov), a source region 6111 and a drain region 6112 in the island-shaped semiconductor layer 6005. The length in the channel direction of this Lov region is set to 0.5 to 3.0 μm, preferably 1.0 to 1.5 μm. A second n-channel type TFT 6103 has a channel-forming region 6113, LDD regions 6114, 6115, a source region 6116 and a drain region 6117 in the island-shaped semiconductor layer 6006. As these LDD regions, there are formed an Lov region and an Ldd region which does not overlap the gate electrode 6030(such an Ldd region will hereafter be referred as Loff); and the length in the channel direction of this Loff region is 0.3 to 2.0 μm, preferably 0.5 to 1.5 μm. The pixel TFT 6104 has channel-forming regions 6118, 6119, Loff regions 6120 to 6123, and source or drain regions 6124 to 6126 in the island-shaped semiconductor layer 6007. The length in the channel direction of the Loff regions is 0.5 to 3.0 μm, preferably 1.5 to 2.5 μm. Further, the storage capacitor 6105 comprises capacitor wirings 6032, 6049, an insulator film composed of the same material as the gate insulator film and a semiconductor layer 6127 which is connected to the drain region 6126 of the pixel TFT 6104 and in which an impurity element for imparting the n conductivity type is added. In FIG. 15, the pixel TFT 6104 is of the double gate structure, but may be of the single gate structure, or may be of a multi-gate structure in witch a plurality of gate electrodes are provided.

As described above, in this embodiment, the structure of the TFTs constituting the respective circuits can be optimized in accordance with the specifications required by the pixel TFTs and the driving circuits; and thus, the operating performance and the reliability of the semiconductor device can be enhanced. Further, since the gate electrodes are formed of a conductive material that has heat resistance, the activation of the LDD regions, the source regions and the drain regions can be easily realized, and, by forming the gate wirings of a low resistance material, the wiring resistance can be sufficiently lowered. Accordingly, the gate electrodes can be applied even to a display device in which the diagonal screen size of the pixel portion is in the 4-inch class or greater.

Further, the liquid crystal display device according to this embodiment may also be constituted in such a manner that the diagonal size of the above-mentioned pixel portion is two inches or more, the channel width of the above-mentioned pixel TFTs is not less than 0.2 μm but not greater than 2 μm (preferably, at least 0.2 μm but not more than 1.3 μm), and the film thickness of the active layer of the above-mentioned pixel TFTs is 10 nm to 50 nm.

Embodiment 8

Figure 16:
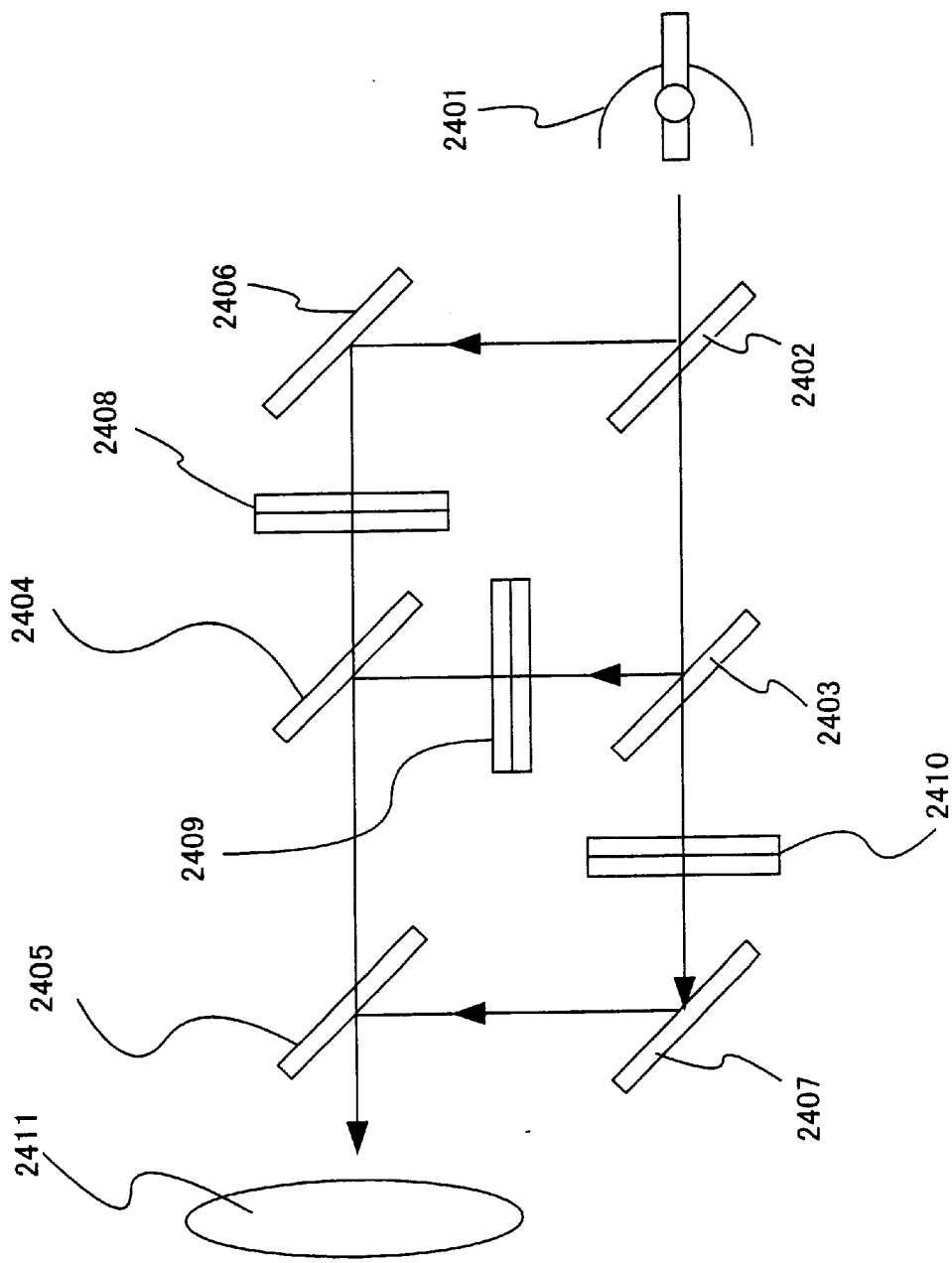
FIG. 16 is a diagram showing an outline of the constitution of a three-plate type projector using the liquid crystal display device according to the invention.

The above-described liquid crystal display device according to the present invention can be used in a three-plate type projector as shown in FIG. 16.

In FIG. 16, numeral 2401 denotes a white light source, numerals 2402 to 2405 denote dichroic mirrors, numerals 2406 and 2407 denote total reflecting mirrors, numeral 2408 to 2410 denote liquid crystal display devices according to the invention, and numeral 2411 denotes a projection lens.

Embodiment 9

Figure 17:
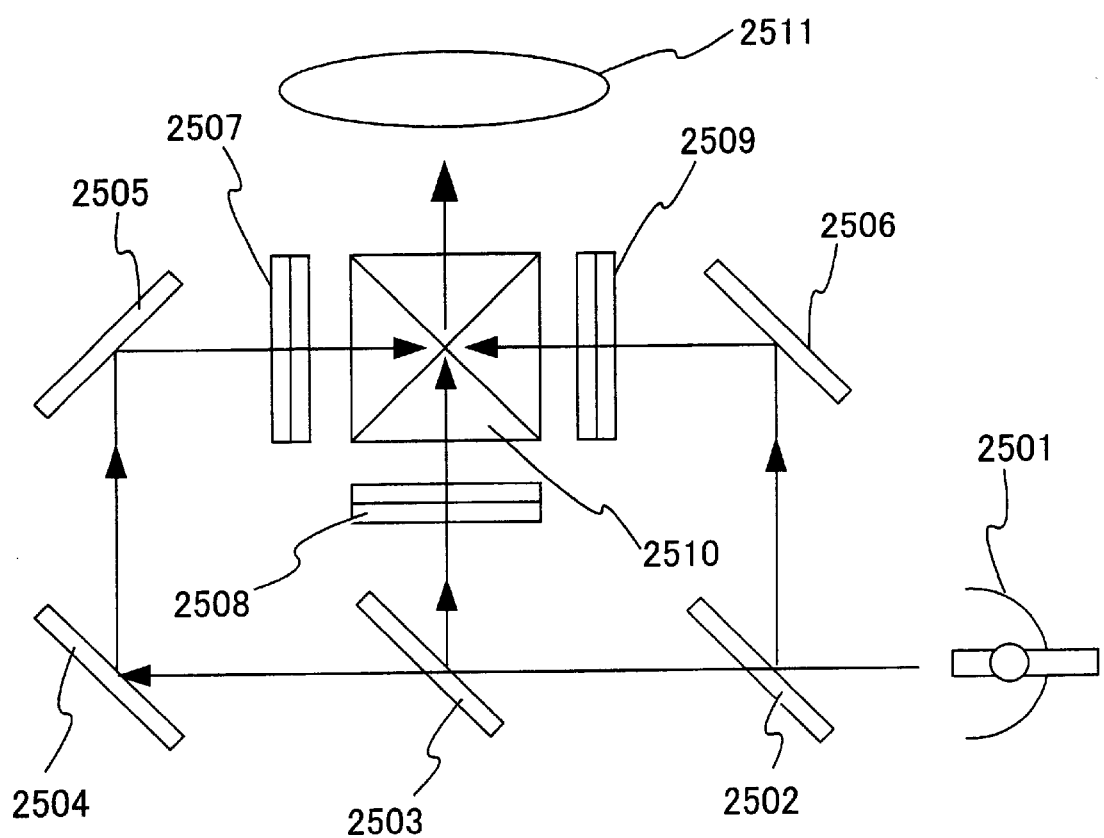
FIG. 17 is a diagram showing an outline of the constitution of a three-plate type projector using the liquid crystal display device according to the invention.

Further, the above-mentioned liquid crystal display device according to the invention can also be used in a three-plate type projector as shown in FIG. 17.

In FIG. 17, numeral 2501 denotes a while light source, numeral 2502 and 2503 denote dichroic mirrors, numeral 2504 to 2506 denote total reflecting mirrors, numeral 2507 to 2509 denote liquid crystal display devices according to the invention, numeral 2510 denotes a dichroic prism, and numeral 2511 denotes a projection lens.

Embodiment 10

Figure 18:
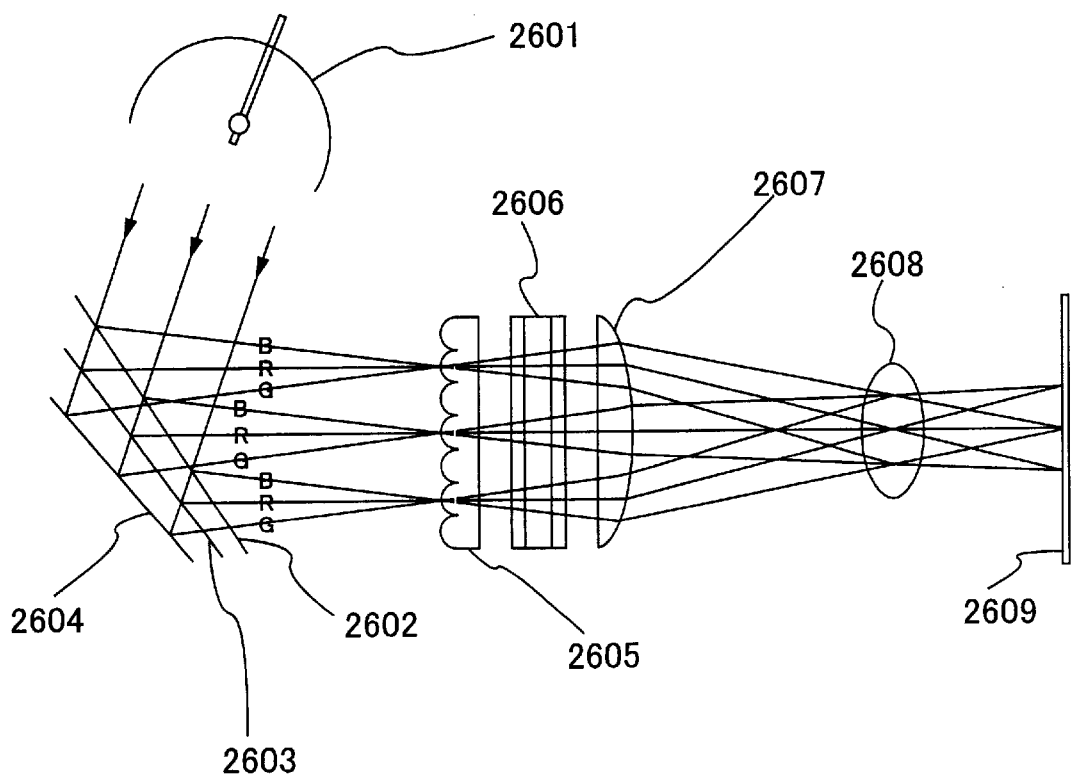
FIG. 18 is a diagram showing an outline of the constitution of a single-plate type projector using the liquid crystal display device according to the invention.

Further, the above-mentioned liquid crystal display device according to the invention can also be used in a single-plate type projector as shown in FIG. 18.

In FIG. 18, numeral 2601 denotes a white light source comprised of a lamp and a reflector, and numerals 2602, 2603 and 2604 denote dichroic mirrors, which selectively reflect the light rays in the wavelength ranges of blue, red and green, respectively. Numeral 2605 denotes a micro lens array, which is comprised of a plurality of micro lenses. Numeral 2606 denotes a liquid crystal display device according to the invention. Numeral 2607 denotes a collective lens, numeral 2608 denotes a projection lens, and numeral 2609 denotes a screen.

Embodiment 11

The projectors according to the above-mentioned Embodiments 7 to 9 are divided into rear projectors and front projectors in accordance with the projection methods.

Figure 19A:
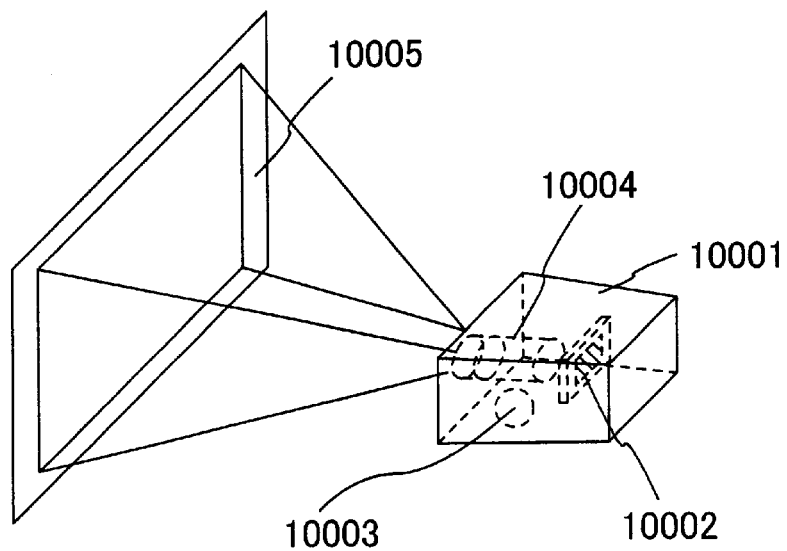
FIGS. 19A–19B is a diagram showing an outline of the constitution of a front projector and a rear projector each using the liquid crystal display device according to the invention.

FIG. 19A shows a front type projector, which is constituted of a main body 10001, a liquid crystal display device 10002 according to the invention, a light source 10003, an optical system 10004, and a screen 10005. In FIG. 19A, a front projector with one liquid crystal display device incorporated therein, however, by incorporating three liquid crystal display devices (which are made to correspond to the light rays of R, G and B, respectively), a front type projector with a higher resolution and a higher precision and minuteness can be realized.

Figure 19B:
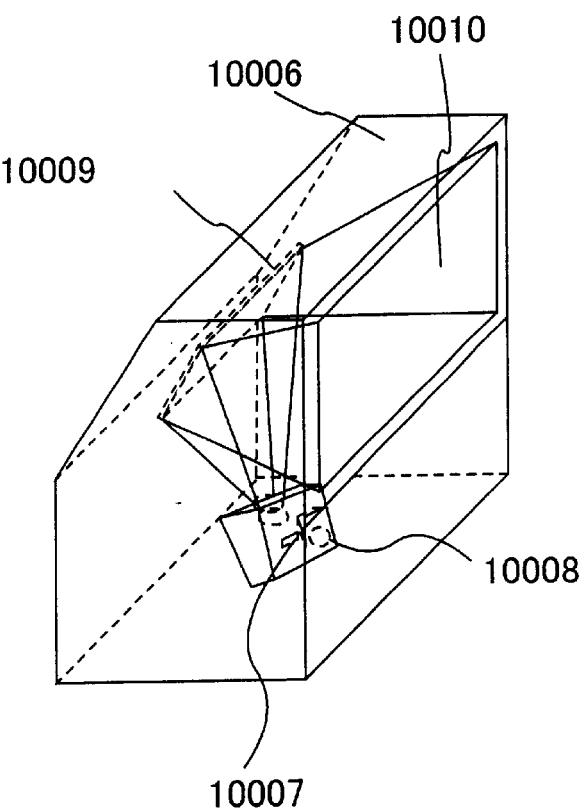

FIG. 19B shows a rear type projector, wherein numeral 10006 denotes a main body, numeral 10007 denotes a liquid crystal display device, numeral 10008 denotes a light source, numeral 10009 denotes a reflector, and numeral 10010 denotes a screen. In FIG. 19B, there is shown a rear type projector in which three active matrix semiconductor display devices (which are made to correspond to the light rays of R, G and B, respectively) are incorporated.

Embodiment 12

This embodiment relates to an example of the case where liquid crystal display devices according to the invention are used in a goggle type display.

Figure 20:
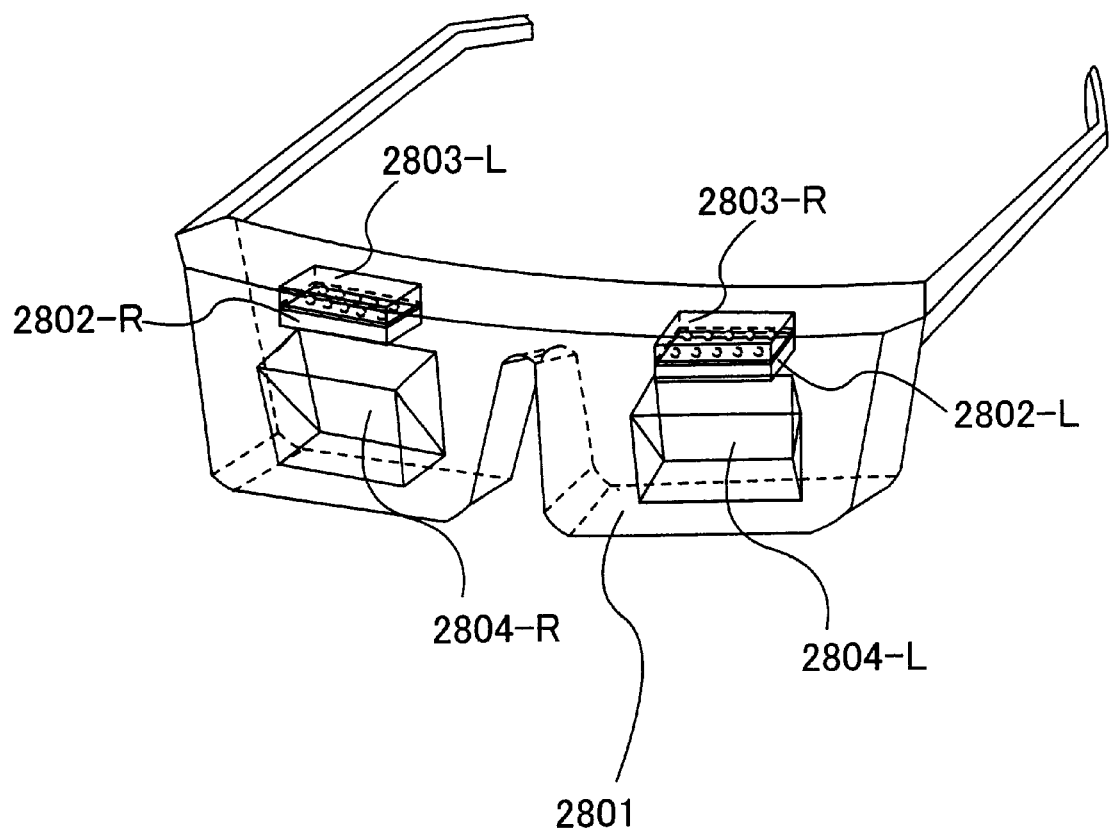
FIG. 20 is a diagram showing an outline of the constitution of a goggle type display using the liquid crystal display device according to the invention.

FIG. 20 will be referred to. Numeral 2801 denotes a main body of the goggle type display. The reference symbols 2802-R and 2802-L denote liquid crystal display devices according to the invention, symbols 2803-R and 2803-L denote LED backlights, and symbols 2804-R and 2804-L denote optical elements.

Embodiment 13

This embodiment relates to examples of the electronic apparatus in which liquid crystal display devices according to the invention are incorporated as display mediums.

As such electronic apparatus, there are enumerated video camera, digital camera, projector (of the rear type or the front type), head-mounting display (goggle type display), car navigator, personal computer, portable remote information terminal (mobile computer, portable telephone or electronic book).

FIG. 21 shows examples of them.

Figure 21A:
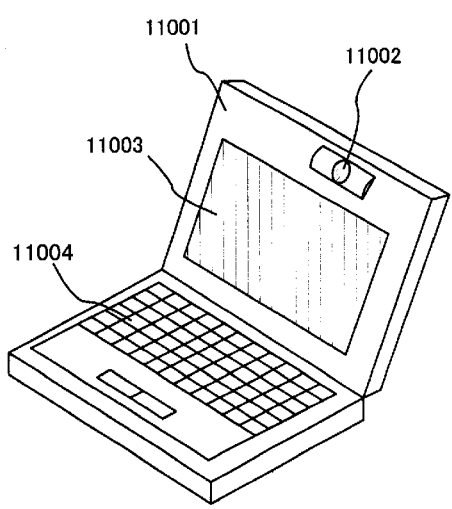
FIGS. 21A–21F shows examples of the electronic apparatus each using a liquid crystal display device or devices according to the invention.

FIG. 21A shows a personal computer, which is constituted of a main body 11001, a picture input portion 11002, a liquid crystal display device 11003 according to the invention, and a keyboard 11004.

Figure 21B:
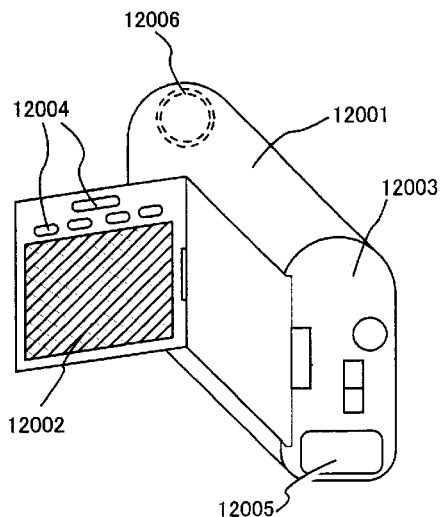

FIG. 21B shows a video camera, which is constituted of a main body 12001, a liquid crystal display device 12002 according to the invention, a voice input portion 12003, operating switches 12004, a battery 12005, and a picture receiving portion 12006.

Figure 21C:
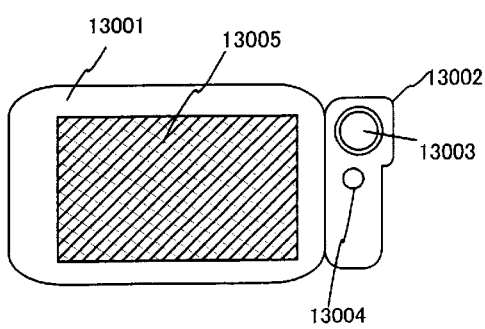

FIG. 21C shows a mobile computer, which is constituted of a main body 13001, a camera portion 13002, a picture receiving portion 13003, an operating switch 13004, and a liquid crystal display device 13005 according to the invention.

Figure 21D:
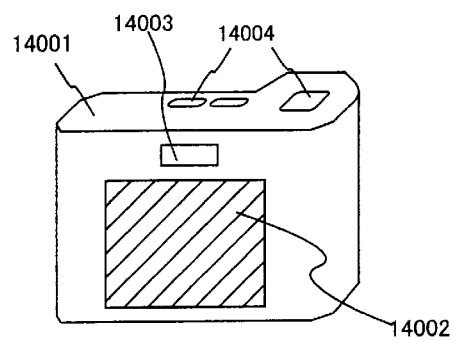

FIG. 21D shows a digital camera, which is constituted of a main body 14001, a liquid crystal display device 14002 according to the invention, an ocular portion 14003, operating switches 14004, and a picture receiving portion (not shown).

Figure 21E:
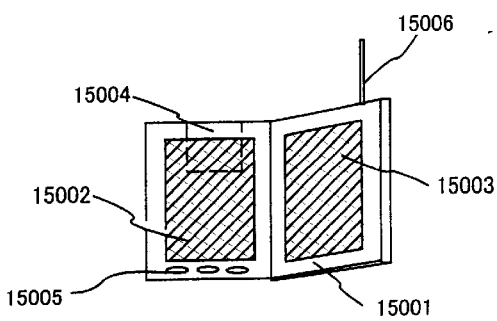

FIG. 21E shows a portable book (electronic book), which is constituted of a main body 15001, liquid crystal display devices 15002, 15003 according to the invention, a storage medium 15004, an operating switch 15005, and an antenna 15006.

Figure 21F:
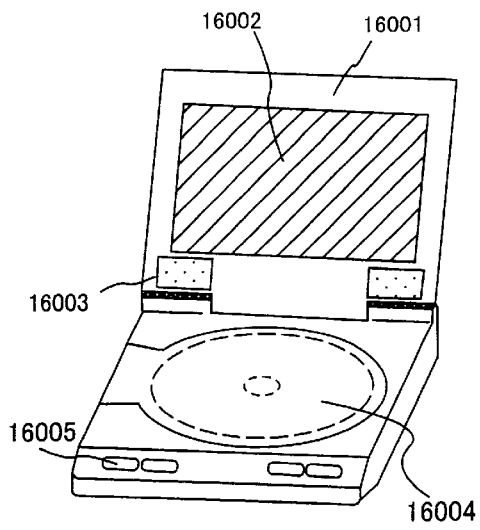

FIG. 21F shows a player using a recording medium (hereinafter referred to as recording medium) on which pictures or programs are recorded; the player is constituted of a main body 16001, a liquid crystal display device 16002, a speaker portion 16003, a recording medium 16004, and an operating switch 16005. This apparatus uses DVD (Digital Versatile Disc), CD, or the like as its recording medium; and, through this apparatus, music and movies can be enjoyed, games can be played, and Internet communications can be carried out.

As described above, the range of application of the present invention is very wide; the invention can thus be applied to electronic apparatus in every field.

According to the liquid crystal display device of the present invention, in at least one of a plurality of sub-frames, which constitute one frame, a reset signal is fed, whereby the display of black is performed, so that image persistence can be prevented.

Further, in the liquid crystal display device according to the invention, picture signals which are equal to each other in absolute value but opposite to each other in polarity are fed in the successive sub-frames, so that the charges opposite in polarity to the spontaneous polarization of the liquid crystal molecules which charges are accumulated when picture signals are fed to the liquid crystal molecules are canceled out. Further, during at least one sub-frame, the display of almost black is performed, so that the "image persistence" of display can be prevented, and a good display can be realized.

What is claimed is:

1. A liquid crystal display device comprising a pixel portion comprising a plurality of pixel TFTs arranged in matrix wise;

a source driver and a gate driver providing picture signals with the plurality of said pixel TFTs; and a liquid crystal material comprising antiferroelectric liquid crystal, wherein one frame is constituted by at least first, second and third sub-frames, wherein a first picture signal is applied to said first sub-frame, wherein a second picture signal having an opposite polarity to said first picture signal is applied to said second sub-frame, and wherein a third picture signal is applied to said third sub-frame so that a black picture display is performed.

2. A liquid crystal display device according to claim 1 wherein said antiferroelectric liquid crystal substantially has no threshold value.

3. A liquid crystal display device according to claim 1 wherein said antiferroelectric liquid crystal has V-shaped electrooptical characteristic.

4. A liquid crystal display device according to claim 1 wherein a diagonal size of said pixel portion is 2 inches or more.

5. A liquid crystal display device according to claim 1 wherein a channel width of each of said pixel TFT is 0.2 to 2 $\mu$m.

6. A liquid crystal display device according to claim 1 wherein a thickness of an active layer of each of said pixel TFTs is 10 nm to 50 nm.

7. A liquid crystal display device according to claim 1 wherein at least one said liquid crystal display device is incorporated into an electronic apparatus selected from the group consisting of a video camera, a digital camera, a rear-type projector, a front-type projector, a head-mounting display device, a car navigator, a personal computer and a portable information terminal.

8. A liquid crystal display device comprising
a pixel portion comprising a plurality of pixel TFTs arranged in matrix wise;
a source driver and a gate driver providing picture signals with the plurality of said pixel TFTs; and
a liquid crystal material comprising antiferroelectric liquid crystal,
wherein one frame is constituted by at least first, second and third sub-frames,
wherein a first picture signal is applied to said first sub-frame,
wherein a second picture signal is applied to said second sub-frame,
wherein a third picture signal is applied to said third sub-frame after said second sub-frame so that a black picture display is performed, and
wherein said first and second picture signals are equal to each other in absolute value and opposite to each other in polarity.

9. A liquid crystal display device according to claim 8 wherein said antiferroelectric liquid crystal substantially has no threshold value.

10. A liquid crystal display device according to claim 8 wherein said antiferroelectric liquid crystal has V-shaped electrooptical characteristic.

11. A liquid crystal display device according to claim 8 wherein a diagonal size of said pixel portion is 2 inches or more.

12. A liquid crystal display device according to claim 8 wherein a channel width of each of said pixel TFT is 0.2 to 2 $\mu$m.

13. A liquid crystal display device according to claim 8 wherein a thickness of an active layer of each of said pixel TFTs is 10 nm to 50 nm.

14. A liquid crystal display device according to claim 8 wherein at least one said liquid crystal display device is incorporated into an electronic apparatus selected from the group consisting of a video camera, a digital camera, a rear-type projector, a front-type projector, a head-mounting display device, a car navigator, a personal computer and a portable information terminal.

15. A liquid crystal display device comprising
a pixel portion comprising a plurality of pixel TFTs arranged in matrix wise;
a source driver and a gate driver providing picture signals with the plurality of said pixel TFTs; and
a liquid crystal material comprising antiferroelectric liquid crystal,
wherein one frame is constituted by n sub-frames (n stands for a natural number of 2 or greater),
wherein a black display by a reset signal is performed during m sub-frames of said n sub-frames (1<m<n, m stands for a natural number),
wherein displays by at least first and second picture signals are performed during (n-m) sub-frames, and
wherein said second picture signal has an opposite polarity to said first picture signal.

16. A liquid crystal display device according to claim 15 wherein said antiferroelectric liquid crystal substantially has no threshold value.

17. A liquid crystal display device according to claim 15 wherein said antiferroelectric liquid crystal has V-shaped electrooptical characteristic.

18. A liquid crystal display device according to claim 15 wherein a diagonal size of said pixel portion is 2 inches or more.

19. A liquid crystal display device according to claim 15 wherein a channel width of each of said pixel TFT is 0.2 to 2 $\mu$m.

20. A liquid crystal display device according to claim 15 wherein a thickness of an active layer of each of said pixel TFTs is 10 nm to 50 nm.

21. A liquid crystal display device according to claim 15 wherein at least one said liquid crystal display device is incorporated into an electronic apparatus selected from the group consisting of a video camera, a digital camera, a rear-type projector, a front-type projector, a head-mounting display device, a car navigator, a personal computer and a portable information terminal.

22. A liquid crystal display device comprising
a pixel portion comprising a plurality of pixel TFTs arranged in matrix wise;
a source driver and a gate driver providing picture signals with the plurality of said pixel TFTs; and
a liquid crystal material comprising antiferroelectric liquid crystal,
wherein one frame is constituted by n sub-frames (n stands for a natural number of 2 or greater), and
wherein a black display by a reset signal is performed during m sub-frames of said n sub-frames (1<m<n, m stands for a natural number),
wherein displays by at least first and second picture signals are performed during (n-m) sub-frames,
wherein said second picture signal has an opposite polarity to said first picture signal, and
wherein said reset signal is applied after said second picture signal was applied.

23. A liquid crystal display device according to claim 22 wherein said antiferroelectric liquid crystal substantially has no threshold value.

24. A liquid crystal display device according to claim 22 wherein said antiferroelectric liquid crystal has V-shaped electrooptical characteristic.

25. A liquid crystal display device according to claim 22 wherein a diagonal size of said pixel portion is 2 inches or more.

26. A liquid crystal display device according to claim 22 wherein a channel width of each of said pixel TFT is 0.2 to 2 $\mu$m.

27. A liquid crystal display device according to claim 22 wherein a thickness of an active layer of each of said pixel TFTs is 10 nm to 50 nm.

28. A liquid crystal display device according to claim 22 wherein at least one said liquid crystal display device is incorporated into an electronic apparatus selected from the group consisting of a video camera, a digital camera, a rear-type projector, a front-type projector, a head-mounting display device, a car navigator, a personal computer and a portable information terminal.

29. A liquid crystal display device comprising
a pixel portion comprising a plurality of pixel TFTs arranged in matrix wise;
a source driver and a gate driver providing picture signals with the plurality of said pixel TFTs; and
a liquid crystal material comprising antiferroelectric liquid crystal,
wherein a display in one frame is formed by displays in a plurality of sub-frames,
wherein said displays in a plurality of said sub-frames are formed in such a manner that picture signals which are equal to each other in absolute value but opposite to each other in polarity are applied as a pair to the same pixel TFTs mentioned above, and wherein a display of black by a reset signal is performed during at least one of a plurality of said sub-frames.

30. A liquid crystal display device according to claim 29 wherein said antiferroelectric liquid crystal substantially has no threshold value.

31. A liquid crystal display device according to claim 29 wherein said antiferroelectric liquid crystal has V-shaped electrooptical characteristic.

32. A liquid crystal display device according to claim 29 wherein a diagonal size of said pixel portion is 2 inches or more.

33. A liquid crystal display device according to claim 29 wherein a channel width of each of said pixel TFT is 0.2 to 2 $\mu$m.

34. A liquid crystal display device according to claim 29 wherein a thickness of an active layer of each of said pixel TFTs is 10 nm to 50 nm.

35. A liquid crystal display device according to claim 29 wherein at least one said liquid crystal display device is incorporated into an electronic apparatus selected from the group consisting of a video camera, a digital camera, a rear-type projector, a front-type projector, a head-mounting display device, a car navigator, a personal computer and a portable information terminal.

36. A liquid crystal display device comprising a pixel portion comprising a plurality of pixel TFTs arranged in matrix wise;

a source driver and a gate driver providing picture signals with the plurality of said pixel TFTs; and a liquid crystal material comprising antiferroelectric liquid crystal, wherein a display in one frame is formed by the displays in m sub-frames (m stands for a natural number), a display of black by a reset signal is performed (n stands for a natural number, and m>n) during at least n sub-frames of said m sub-frames, and wherein said displays in (m-n) sub-frames are formed in such a manner that picture signals which are equal to each other in absolute value but opposite to each other in polarity are applied as a pair to the same pixel TFTs mentioned above.

37. A liquid crystal display device according to claim 36 wherein said antiferroelectric liquid crystal substantially has no threshold value.

38. A liquid crystal display device according to claim 36 wherein said antiferroelectric liquid crystal has V-shaped electrooptical characteristic.

39. A liquid crystal display device according to claim 36 wherein a diagonal size of said pixel portion is 2 inches or more.

40. A liquid crystal display device according to claim 36 wherein a channel width of each of said pixel TFT is 0.2 to 2 $\mu$m.

41. A liquid crystal display device according to claim 36 wherein a thickness of an active layer of each of said pixel TFTs is 10 nm to 50 nm.

42. A liquid crystal display device according to claim 36 wherein at least one said liquid crystal display device is incorporated into an electronic apparatus selected from the group consisting of a video camera, a digital camera, a rear-type projector, a front-type projector, a head-mounting display device, a car navigator, a personal computer and a portable information terminal.

* * * * *